(12) United States Patent
Wang et al.

(10) Patent No.: US 11,869,270 B2
(45) Date of Patent: Jan. 9, 2024

(54) SENSING DEVICE

(71) Applicant: AUO Corporation, Hsinchu (TW)

(72) Inventors: Shuo-Hong Wang, Hsinchu (TW);
Yang-En Wu, Hsinchu (TW);
Shih-Hsing Hung, Hsinchu (TW);
Chao-Chien Chiu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/297,018

(22) Filed: Apr. 7, 2023

(65) Prior Publication Data

US 2023/0351799 A1 Nov. 2, 2023

Related U.S. Application Data

(60) Provisional application No. 63/335,894, filed on Apr. 28, 2022.

(30) Foreign Application Priority Data

Jul. 21, 2022 (TW) .................................. 111127392

(51) Int. Cl.
*G06V 40/13* (2022.01)
(52) U.S. Cl.
CPC ................. *G06V 40/1318* (2022.01)
(58) Field of Classification Search
CPC .... H10K 59/122; H10K 59/12; H10K 59/121; G09G 3/32; G09G 3/3225; G09G 2300/0426; G09G 2360/142; G09G 2360/144; H01L 27/14; H01L 27/156; G02F 2201/123; G06V 40/1318
See application file for complete search history.

(56) References Cited

U.S. PATENT DOCUMENTS

| 10,727,286 | B2 | 7/2020 | Chang et al. |
| 2017/0169273 | A1* | 6/2017 | Wu .................. G06V 40/1329 |
| 2019/0012512 | A1* | 1/2019 | He .................. G06V 40/1324 |
| 2019/0198585 | A1 | 6/2019 | Chang et al. |

FOREIGN PATENT DOCUMENTS

| TW | I652534 | 3/2019 |
| TW | I746375 | 11/2021 |
| TW | 202247431 | 12/2022 |
| TW | I791397 | 2/2023 |

* cited by examiner

*Primary Examiner* — Abhishek Sarma
(74) *Attorney, Agent, or Firm* — JCIPRNET

(57) ABSTRACT

A sensing device includes a first substrate, a first sensing element, a first light-shielding layer, a second light-shielding layer and an insulating layer. The first sensing element is disposed on the first substrate. The first light-shielding layer is disposed on the first sensing element and has a first opening, wherein the first opening is completely overlapped with the first sensing element. The second light-shielding layer is disposed on the first light-shielding layer and includes an upper light-shielding part and a lateral light-shielding part, wherein the upper light-shielding part is overlapped with the first light-shielding layer and has a second opening, and the lateral light-shielding part is separated from the upper light-shielding part. The insulating layer is disposed between the first light-shielding layer and the second light-shielding layer, and the lateral light-shielding part covers a sidewall of the insulating layer.

20 Claims, 20 Drawing Sheets

SENSING DEVICE

CROSS-REFERENCE TO RELATED APPLICATION

This application claims the priority benefit of U.S. provisional application No. 63/335,894, filed on Apr. 28, 2022, and Taiwan application serial no. 111127392, filed on Jul. 21, 2022. The entirety of each of the above-mentioned patent applications is hereby incorporated by reference herein and made a part of this specification.

BACKGROUND

Technical Field

The disclosure relates to an optoelectronic device and, in particularly, to a sensing device.

Description of Related Art

In order to provide the information needed to build a smart living environment, various sensors have been widely used in daily life. For example, fingerprint sensors have been widely used in the unlocking of personal electronic products and identity verification at customs due to their ability to identify human fingerprints. With the reflected light of different intensities generated by the ridges and valleys in fingerprints, the sensing element can detect the light reflected by fingerprints to generate currents of different magnitudes, and then obtain the fingerprint image for identification.

Since the sensor can perform various sensing with different light sources (such as visible light and infrared light), how to make the optical-mechanical structure of the sensor conducive in cooperation with various light sources and integration with various types of sensors in order to provide functions such as fingerprint recognition and vein anti-counterfeiting at the same time is still one of the challenges that the industry is eager to break through.

SUMMARY

The disclosure provides a sensing device with an improved optical-mechanical structure.

In an embodiment of the disclosure, a sensing device is provided. The sensing device includes a first substrate; a first sensing element disposed over the first substrate; a first light-shielding layer disposed on the first sensing element and having a first opening, wherein the first opening completely overlaps the first sensing element; a second light-shielding layer disposed on the first light-shielding layer and including an upper light-shielding part and a lateral light-shielding part, wherein the upper light-shielding part overlaps the first light-shielding layer and has a second opening, and the lateral light-shielding part is separated from the upper light-shielding part; and an insulating layer disposed between the first light-shielding layer and the second light-shielding layer, wherein the lateral light-shielding part covers a sidewall of the insulating layer.

In an embodiment of the disclosure, the lateral light-shielding part is electrically connected to the first light-shielding layer.

In an embodiment of the disclosure, an angle between the lateral light-shielding part and the first light-shielding layer ranges from 30 degrees to 85 degrees.

In an embodiment of the disclosure, the second opening overlaps the first opening.

In an embodiment of the disclosure, the second opening does not overlap the first opening.

In an embodiment of the disclosure, the lateral light-shielding part surrounds the upper light-shielding part.

In an embodiment of the disclosure, the sensing device further comprises a light emitting element disposed on the second light-shielding layer, wherein a first electrode of the light emitting element is electrically connected to the upper light-shielding part, and a second electrode of the light emitting element is electrically connected to the lateral light-shielding part.

In an embodiment of the disclosure, the light emitting element partially overlaps the first sensing element.

In an embodiment of the disclosure, the light emitting element includes a first light emitting element and a second light emitting element, and a wavelength range of light emitted by the first light emitting element is different from a wavelength range of light emitted by the second light emitting element.

In an embodiment of the disclosure, the sensing device further comprises a second sensing element disposed between the first sensing element and the second light-shielding layer, wherein the first light-shielding layer serves as a first electrode of the second sensing element.

In an embodiment of the disclosure, the upper light-shielding part is electrically connected to a second electrode of the second sensing element.

In an embodiment of the disclosure, a gap between the upper light-shielding part and the lateral light-shielding part overlaps the second sensing element.

In an embodiment of the disclosure, the sensing device further comprises a second substrate and a third sensing element, wherein the second substrate is disposed over the second light-shielding layer, and the third sensing element is disposed between the second substrate and the second light-shielding layer.

In another embodiment of the disclosure, a sensing device is provided. The sensing device includes a first substrate; a first sensing element disposed over the first substrate and includes: a first electrode; a second electrode disposed over the first electrode; and a sensing layer disposed between the first electrode and the second electrode; a first light-shielding layer disposed on the first sensing element and having a first opening, wherein the first opening overlaps the first electrode, the sensing layer and the second electrode; a second light-shielding layer disposed on the first light-shielding layer and having a light-receiving region and a light-receiving edge adjacent to the light-receiving region; and an insulating layer disposed between the first light-shielding layer and the second light-shielding layer, wherein a ratio of a spacing between a side of an orthographic projection of the first opening on the second light-shielding layer farthest from the light-receiving edge and the light-receiving edge to a maximum spacing between the second light-shielding layer and the sensing layer is 0.3 to 1.8.

In an embodiment of the disclosure, a ratio of a light-receiving distance of the light-receiving region to the maximum spacing between the second light-shielding layer and the sensing layer is greater than or equal to a ratio of a distance between the second light-shielding layer and an upper surface of the sensing device to a distance between the sensing layer and the upper surface of the sensing device.

In an embodiment of the disclosure, a ratio of a light-receiving distance of the light-receiving region to a height difference between an upper surface of the first light-shielding layer and the first opening is greater than or equal to a ratio of a distance between the second light-shielding layer and an upper surface of the sensing device to a distance between the sensing layer and the upper surface of the sensing device.

In an embodiment of the disclosure, the sensing device further comprises a signal line, and a spacing between an orthographic projection of the first opening on the upper surface of the first light-shielding layer and an end of the first light-shielding layer close to the signal line is greater than or equal to a spacing between an orthographic projection of the signal line on the first light-shielding layer and the first light-shielding layer.

In an embodiment of the disclosure, the orthographic projection of the signal line on the first light-shielding layer is adjacent to the first light-shielding layer.

In an embodiment of the disclosure, a smaller of a spacing between the orthographic projection of the signal line on the first light-shielding layer and the first light-shielding layer and a spacing between an orthographic projection of the signal line on the second light-shielding layer and the second light-shielding layer is less than or equal to half of a spacing between centers of two adjacent first opening.

In an embodiment of the disclosure, the sensing device further comprises a first sensing unit and a second sensing unit, wherein the first sensing unit includes the first sensing element, the first light-shielding layer and the second light-shielding layer, the second sensing unit includes the first sensing element, the second light-shielding layer and a third light-shielding layer, a position of the third light-shielding layer relative to the first sensing element and the second light-shielding layer in the second sensing unit is the same as a position of the first light-shielding layer relative to the first sensing element and the second light-shielding layer in the first sensing unit, and the third light-shielding layer has no opening.

In order to make the above-mentioned features and advantages of the disclosure more comprehensible, the following specific embodiments are described in detail together with the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
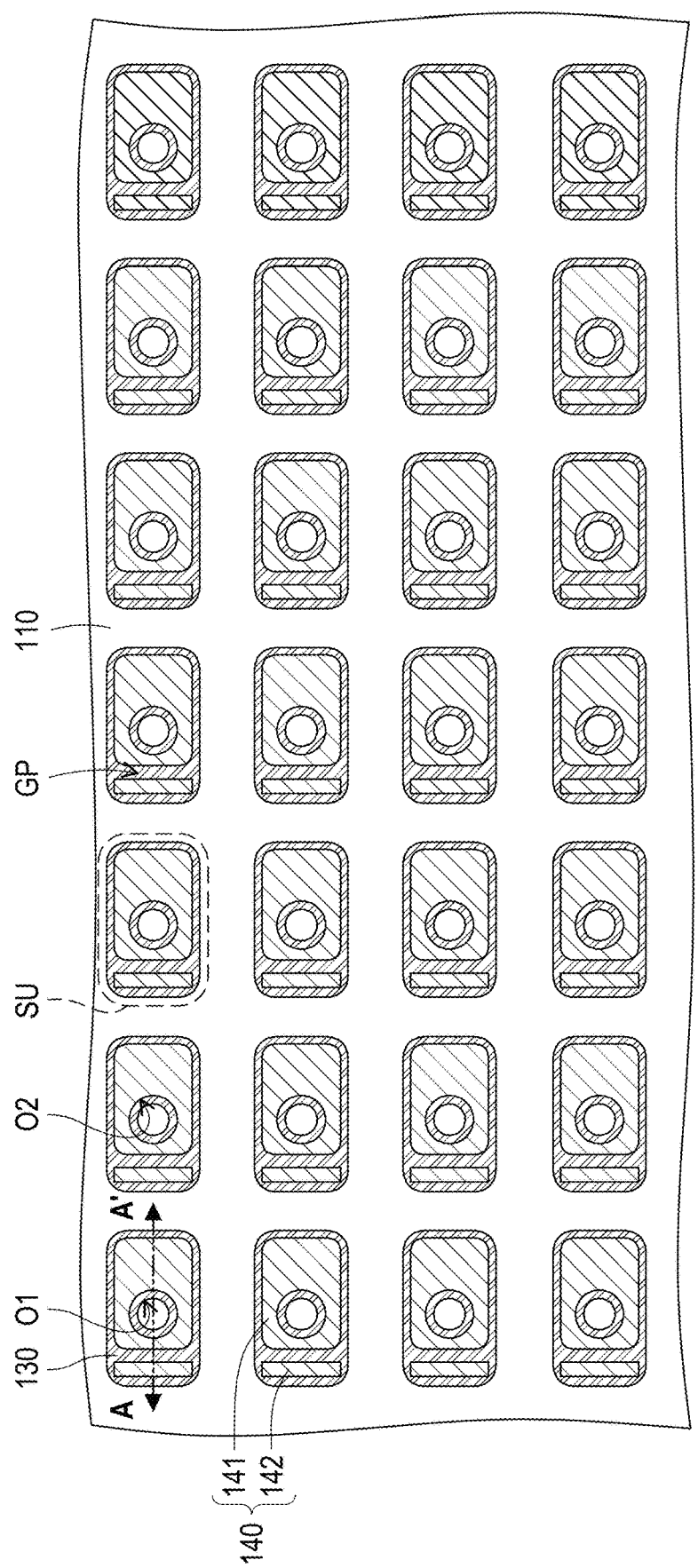
FIG. 1A is a schematic partial top view of a sensing device 10 according to an embodiment of the disclosure.

In the drawings, the thickness of layers, films, panels, regions, etc., is exaggerated for clarity. Throughout the specification, the same reference numerals represent the same elements. It should be understood that when an element such as a layer, a film, a region, or a substrate is referred to as being "on" another element or "connected to" another element, the element may be directly on the another element or connected to the another element, or there may be an intermediate element. In contrast, when an element is referred to as being "directly on" another element or "directly connected to" another element, there is no intermediate element. As used herein, "connection" may refer to physical and/or electrical connection. Furthermore, "electrical connection" or "coupling" may be that there is another element between two elements.

It should be understood that although terms such as "first", "second", and "third" may be used herein to describe various elements, components, regions, layers, and/or portions, the elements, components, regions, and/or portions are not limited by the terms. The terms are only used to distinguish one element, component, region, layer, or portion from another element, component, region, layer, or portion. Therefore, a first "element", "component", "region", "layer", or "portion" discussed below may be referred to as a second element, component, region, layer, or portion without departing from the teachings herein.

The terms used herein are only for the purpose of describing specific embodiments and are not limiting. As used herein, unless the content clearly indicates otherwise, the singular forms "a", "one", and "the" are intended to include plural forms, including "at least one" or representing "and/or". As used herein, the term "and/or" includes any and all combinations of one or more of the relevant listed items. It should also be understood that when used in the specification, the terms "containing" and/or "including" designate the presence of the feature, the region, the entirety, the step, the operation, the element, and/or the component, but do not exclude the presence or the addition of one or more other features, regions, entireties, steps, operations, elements, components, and/or combinations thereof.

In addition, relative terms such as "lower" or "bottom" and "upper" or "top" may be used herein to describe the relationship between an element and another element, as shown in the drawings. It should be understood that the relative terms are intended to include different orientations of a device in addition to the orientation shown in the drawings. For example, if the device in a drawing is flipped, an element described as being on the "lower" side of other elements will be oriented on the "upper" side of the other elements. Therefore, the exemplary term "lower" may include the orientations of "lower" and "upper", depending on the specific orientation of the drawing. Similarly, if the device in a drawing is flipped, an element described as being "under" or "below" other elements will be oriented "above" the other elements. Therefore, the exemplary term "under" or "below" may include the orientations of above and below.

Unless otherwise defined, all terms (including technical and scientific terms) used herein have the same meaning as commonly understood by persons skilled in the art of the disclosure. It will be further understood that terms such as those defined in commonly used dictionaries should be interpreted as having meanings consistent with the meanings in the related art and the context of the disclosure, and will not be interpreted as having idealized or overly formal meanings unless explicitly defined herein.

The exemplary embodiments are described herein with reference to cross-sectional views that are schematic views of idealized embodiments. Therefore, changes in shapes of illustration as a result of, for example, manufacturing technology and/or tolerances may be expected. Therefore, the embodiments described herein should not be interpreted as being limited to the specific shapes of regions as shown herein, but include, for example, shape deviations caused by manufacturing. For example, a region that is shown or described as flat may generally have rough and/or non-linear features. In addition, an acute angle shown may be rounded. Therefore, the regions shown in the drawings are schematic in nature, and the shapes thereof are not intended to show the precise shapes of the regions and are not intended to limit the scope of the claims.

Figure 1B:
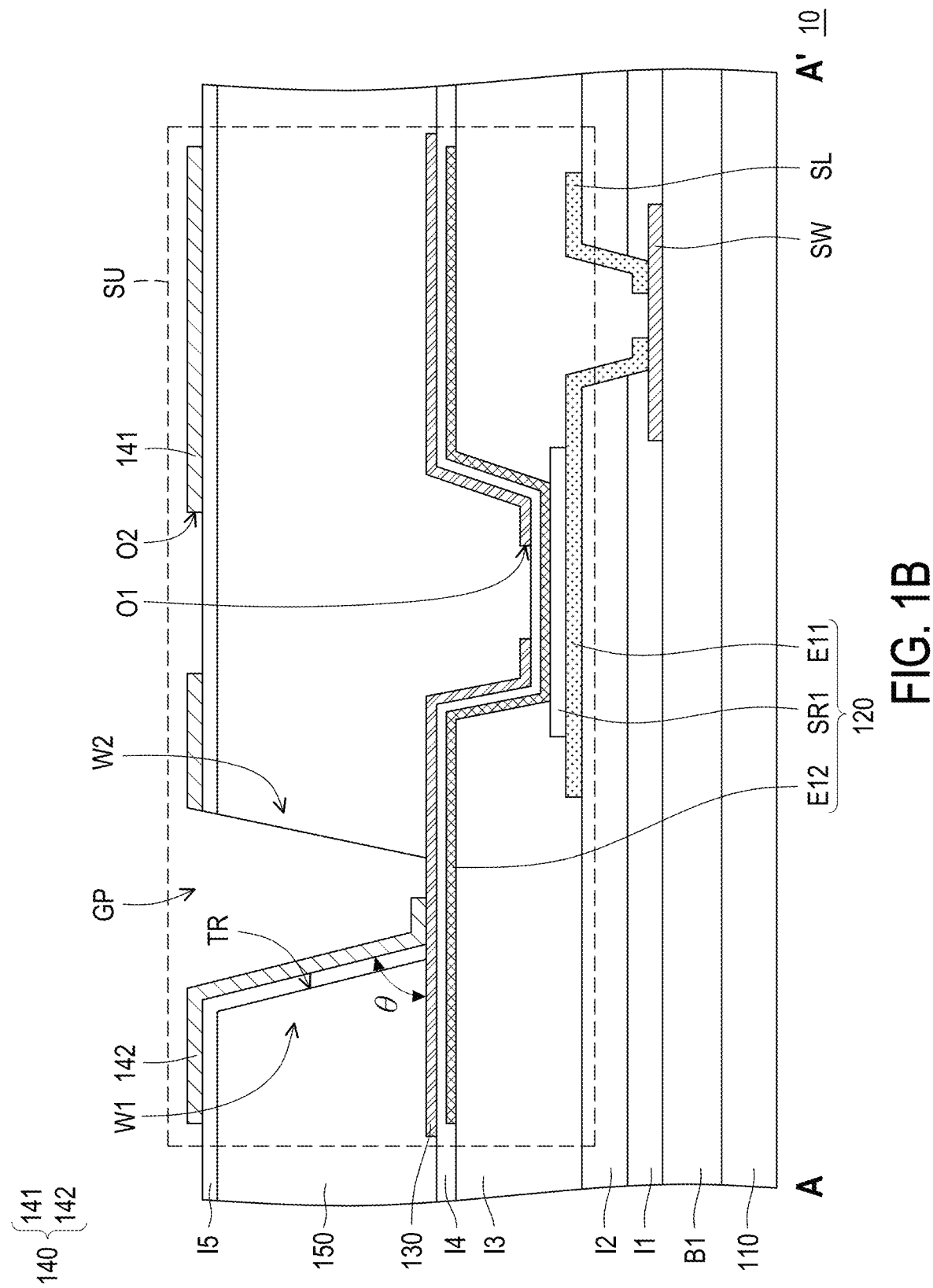
FIG. 1B is a schematic cross-sectional view taken along the section line A-A' of FIG. 1A.

FIG. 1A is a schematic partial top view of a sensing device 10 according to an embodiment of the disclosure. FIG. 1B is a schematic cross-sectional view taken along the section line A-A' of FIG. 1A. In order to make the drawing more concise, FIG. 1A schematically depicts the first substrate 110, the first light-shielding layer 130 and the second light-shielding layer 140, and omits other components and film layers.

With reference to FIG. 1A to FIG. 1B, the sensing device 10 includes: a first substrate 110; a first sensing element 120 disposed on the first substrate 110; a first light-shielding layer 130 disposed on the first sensing element 120 and having a first opening O1, wherein the first opening O1 completely overlaps the first sensing element 120; a second light-shielding layer 140 disposed on the first light-shielding layer 130 and including an upper light-shielding part 141 and a lateral light-shielding part 142, wherein the upper light-shielding part 141 overlaps the first light-shielding layer 130 and has a second opening O2, and the lateral light-shielding part 142 is separated from the upper light-shielding part 141; and an insulating layer 150 disposed between the first light-shielding layer 130 and the second light-shielding layer 140, wherein the lateral light-shielding part 142 covers a sidewall W1 of the insulating layer 150.

In the sensing device 10 according to an embodiment of the disclosure, the optical-mechanical structure configured by the first light-shielding layer 130 and the second light-shielding layer 140 can flexibly adjust the light-receiving angle, light-receiving range and light-receiving amount of the first sensing element 120, and can also facilitate the subsequent setting of light emitting element and other sensing elements. Hereinafter, the implementation of each component of the sensing device 10 is further illustrated with reference to FIG. 1A to FIG. 1B, but the disclosure is not limited thereto.

In this embodiment, the first substrate 110 may be a transparent substrate or an opaque substrate, and its material may be ceramic, quartz, glass, polymer or other suitable materials, but is not limited thereto. Various film layers for forming the first sensing element 120, the first light-shielding layer 130, the second light-shielding layer 140, the insulating layer 150 and other signal lines, switching elements, storage capacitors, etc. can be disposed on the first substrate 110.

The first sensing element 120 may be a visible light sensing element, such as a fingerprint sensing element that senses visible light, but is not limited thereto. For example, the first sensing element 120 may include an electrode E11, a sensing layer SR1, and an electrode E12, in which the electrode E11 may be located between the first substrate 110 and the sensing layer SR1, and the sensing layer SR1 may be located between the electrode E11 and the electrode E12. In some embodiments, the first sensing element 120 may be an invisible light sensing element, such as a fingerprint sensing element that senses infrared (IR) light.

For example, the material of the electrode E11 can be molybdenum, aluminum, titanium, copper, gold, silver or other conductive materials, or an alloy combination or stack of two or more of the above materials. The material of the sensing layer SR1 may be silicon-rich oxide (SRO), germanium doped silicon-rich oxide, or other suitable materials such as organic photodiodes. The material of electrode E12 is preferably a transparent conductive material, such as indium tin oxide, indium zinc oxide, aluminum tin oxide, aluminum zinc oxide, indium gallium zinc oxide or other suitable oxides, or a stack of at least two of the above materials.

In some embodiments, the sensing device 10 may further include an insulating layer 13, and the insulating layer 13 may be disposed between the electrode E11 and the sensing layer SR1 of the first sensing element 120 and the electrode E12 of the first sensing element 120. The material of the insulating layer 13 may include organic materials, such as acrylic materials, siloxane materials, polyimide materials, epoxy materials or a stack of the above materials, but the disclosure is not limited thereto.

In some embodiments, the sensing device 10 may further include a switching element SW located between the first sensing element 120 and the first substrate 110, and the switching element SW may be electrically connected to the electrode E11 of the first sensing element 120 and the signal line SL. When the switching element SW is turned on, the signal from the signal line SL can be transmitted to the electrode E11 of the first sensing element 120. In some embodiments, the sensing device 10 may further include a buffer layer B1, which may be disposed between the switching element SW and the first substrate 110 to prevent impurities in the first substrate 110 from migrating into the switching element SW.

In some embodiments, the sensing device 10 may further include an insulating layer I1 and an insulating layer 12, both of which may be disposed between the switching element SW and the electrode E11 of the first sensing element 120 and between the switching element SW and the signal line SL to avoid unnecessary electrical connections. Materials of the insulating layer I1 and insulating layer 12 may include transparent insulating materials, such as silicon oxide, silicon nitride, silicon oxynitride, a stack of the above materials or other suitable materials, but the disclosure is not limited thereto.

The first light-shielding layer 130 may be disposed on the first sensing element 120. The first light-shielding layer 130 has a first opening O1, and the orthographic projection of the first opening O1 on the first substrate 110 may completely overlap the orthographic projection of the sensing layer SR1 on the first substrate 110, so as to adjust the light-receiving range of the sensing layer SR1 and amount of light received by the sensing layer SR1.

In some embodiments, the sensing device 10 may further include an insulating layer 14, which may be disposed between the electrode E12 of the first sensing element 120 and the first light-shielding layer 130 to avoid unnecessary electrical connections. The insulating layer 14 is made of transparent insulating materials such as silicon oxide, silicon nitride, silicon oxynitride and the like.

In this embodiment, the upper light-shielding part 141 and the lateral light-shielding part 142 of the second light-shielding layer 140 may completely overlap the first light-shielding layer 130, but the disclosure is not limited thereto. In other embodiments, the upper light-shielding part 141 or the lateral light-shielding part 142 may partially overlap the first light-shielding layer 130. For the convenience of subsequent illustration, the first sensing element 120, the first light-shielding layer 130 overlapping the first sensing element 120, and the upper light-shielding part 141 and the lateral light-shielding part 142 overlapping the first light-shielding layer 130 are referred to as a sensing unit SU herein.

In this embodiment, the orthographic projection of the first opening O1 of the first light-shielding layer 130 on the first substrate 110 may completely overlap the orthographic projection of the second opening O2 of the upper light-shielding part 141 on the first substrate 110, so that the light-receiving range of the sensing layer SR1 is mainly distributed directly above the first sensing element 120, but the disclosure is not limited thereto. In other embodiments, the first opening O1 of the first light-shielding layer 130 may partially overlap or not overlap the second opening O2 of the upper light-shielding part 141.

The insulating layer 150 may be interposed between the upper light-shielding part 141 of the second light-shielding layer 140 and the first light-shielding layer 130. In this embodiment, the upper light-shielding part 141 may be completely disposed on the insulating layer 150, but the disclosure is not limited thereto. In other embodiments, the upper light-shielding part 141 may further extend toward the first light-shielding layer 130, and the upper light-shielding part 141 and the first light-shielding layer 130 are still electrically separated.

In this embodiment, the insulating layer 150 may have a trench TR, and the sidewall W1 and the sidewall W2 of the insulating layer 150 may be two opposite sidewalls forming the trench TR. The lateral light-shielding part 142 may be disposed on the side of the sidewall W1 and disposed along the sidewall W1, that is, the lateral light-shielding part 142 may cover the sidewall W1. The upper light-shielding part 141 may be disposed on the side of the sidewall W2, so that the lateral light-shielding part 142 is kept separated from the upper light-shielding part 141 by the trench TR. In some embodiments, the sensing device 10 may further include an insulating layer 15, which may be disposed between the upper light-shielding part 141 and the insulating layer 150 and between the lateral light-shielding part 142 and the insulating layer 150.

In some embodiments, the trench TR of the insulating layer 150 may overlap the first light-shielding layer 130, and the lateral light-shielding part 142 can extend toward the first light-shielding layer 130 along the sidewall W1, so as to shield the light from the side of the lateral light-shielding part 142 opposite the first sensing element 120, especially strong light from far away. In addition, the first opening O1 of the first light-shielding layer 130 can further cooperate with the gap GP between the lateral light-shielding part 142 and the upper light-shielding part 141 to regulate the light-receiving angle of the sensing layer SR1, so that another light-receiving range of the sensing layer SR1 can come from the top left of the first sensing element 120.

In some embodiments, the lateral light-shielding part 142 can be electrically connected to the first light-shielding layer 130. In certain embodiments, the lateral light-shielding part 142 may extend to the first light-shielding layer 130 along the sidewall W1, so that the lateral light-shielding part 142 can be physically connected to the first light-shielding layer 130. In this way, when the first light-shielding layer 130 is electrically connected to the system voltage, the first light-shielding layer 130 can also serve as a signal line of the sensing device 10, such as a common electrode line or a power line, and the lateral light-shielding part 142 can serve as a bonding pad for electrically connecting to, for example, a light emitting element. Likewise, the upper light-shielding part 141 can also be electrically connected to the system voltage to act as a signal line or bonding pad of the sensing device 10. In some embodiments, the angle θ between the lateral light-shielding part 142 and the first light-shielding layer 130 may range from 30 degrees to 85 degrees, such as 40 degrees, 60 degrees or 80 degrees.

For example, the material of the first light-shielding layer 130 and the second light-shielding layer 140 may include a conductive light-shielding material, such as a stack of metal and metal oxide, metal oxynitride, black resin or graphite, but is not limited thereto. In some embodiments, the insulating layer 150 may be made of organic materials, such as acrylic materials, siloxane materials, polyimide materials, epoxy materials or a stack of the above materials.

In the subsequent paragraphs, other embodiments of the disclosure are further illustrated with reference to FIG. 2 to FIG. 8. Reference numerals and relevant content of the components of the embodiments of FIG. 1A to FIG. 1B are used in the illustration, the same reference numerals are used to denote the same or similar components, and the illustration of the same technical content is omitted. For the omitted illustration, refer to the embodiments of FIG. 1A to FIG. 1B, which is not repeated hereinafter.

Figure 2A:
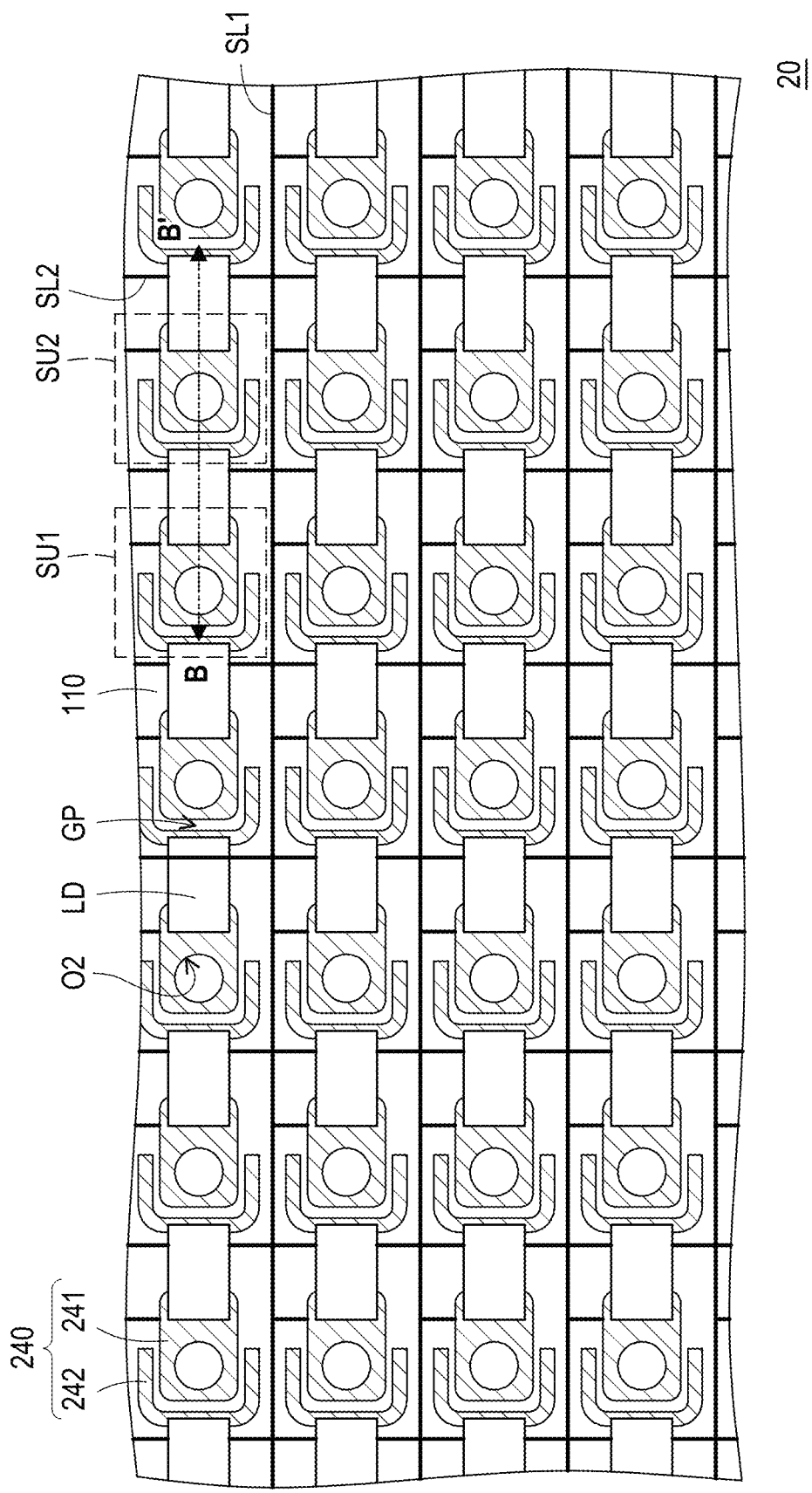
FIG. 2A is a schematic partial top view of a sensing device 20 according to an embodiment of the disclosure.
Figure 2B:
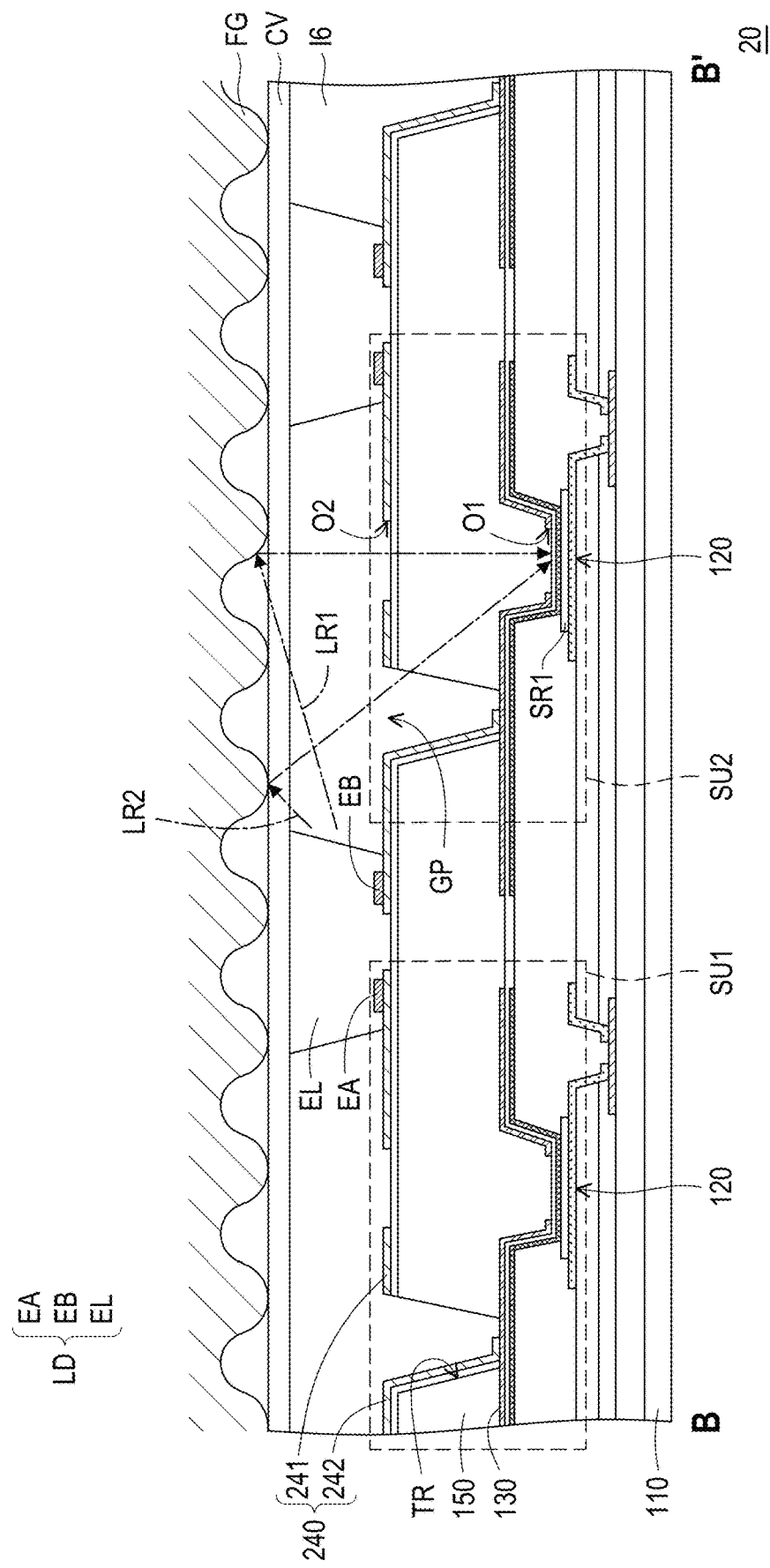
FIG. 2B is a schematic cross-sectional view taken along the section line B-B' of FIG. 2A.

FIG. 2A is a schematic partial top view of a sensing device 20 according to an embodiment of the disclosure. FIG. 2B is a schematic cross-sectional view taken along the section line B-B' of FIG. 2A. In this embodiment, the sensing device 20 may include: a first substrate 110, a first sensing element 120, a first light-shielding layer 130, a second light-shielding layer 240 and an insulating layer 150. In order to make the drawing more concise, the first light-shielding layer 130 is omitted in FIG. 2A.

Compared with the sensing device 10 shown in FIGS. 1A to 1B, the sensing device 20 shown in FIGS. 2A to 2B is mainly different in that the lateral light-shielding part 242 of the second light-shielding layer 240 of the sensing device 20 has a U-shaped top profile, and the sensing device 20 may further include a light emitting element LD.

For example, please refer to FIG. 2A. In this embodiment, the second light-shielding layer 240 may include an upper light-shielding part 241 and a lateral light-shielding part 242, and the lateral light-shielding part 242 may surround one end of the upper light-shielding part 241 that is not electrically connected to the light emitting element LD on three sides of that end to exhibit a U-shaped profile.

With reference to FIG. 2B, FIG. 2B shows two sensing units SU1 and SU2 of the sensing device 20, and the two electrodes of the light emitting element LD can be electrically connected to the upper light-shielding part 241 and the lateral light-shielding part 242 respectively. For example, in this embodiment, the light emitting element LD may include a light emitting body EL, a first electrode EA and a second electrode EB, in which the first electrode EA of the light emitting element LD can be electrically connected to the upper light-shielding part 241 of the sensing unit SU1, and the second electrode EB of the light emitting element LD can be electrically connected to the lateral light-shielding part 242 of the sensing unit SU2. In other words, the light emitting element LD can be connected between the two sensing units.

In some embodiments, the first electrode EA of the light emitting element LD can be electrically connected to the upper light-shielding part 241 of the sensing unit SU1, and the second electrode EB of the light emitting element LD can be electrically connected to the lateral light-shielding part 242 of the sensing unit SU1, which means that in some cases, the light emitting element LD can also be electrically connected to the upper light-shielding part 241 and the lateral light-shielding part 242 of the same sensing unit SU1.

In some embodiments, the sensing device 20 may further include signal lines SL1 and SL2, and the signal lines SL1 and SL2 may independently be, for example, common electrode lines, power lines, scan lines or data lines. For example, the upper light-shielding part 241 can be electrically connected to the signal line SL1, and the lateral light-shielding part 242 can be electrically connected to the signal line SL2. In this way, the first electrode EA and the second electrode EB of the light emitting element LD can be electrically connected to the signal line SL1 and the signal line SL2 through the upper light-shielding part 241 and the lateral light-shielding part 242 respectively.

In this embodiment, the light emitting element LD is disposed over the first sensing element 120, and the orthographic projection of the light emitting element LD on the first substrate 110 may be outside the orthographic projection of the sensing layer SR1 of the first sensing element 120 on the first substrate 110. In other words, the light emitting element LD may not overlap the sensing layer SR1 of the first sensing element 120, so as not to affect the sensing layer SR1 receiving light from directly above. In addition, since the light emitting element LD as the light source is not disposed on the same film layers as the first sensing element 120, there is no need to reserve an arrangement location for the light emitting element LD between the first sensing elements 120. Furthermore, since the light emitting element LD is not disposed under the first sensing element 120, there is no need to reserve an opening area required for the light path of the light emitting element LD between the first sensing elements 120, so the setting density of the first sensing element 120 can be increased.

In this embodiment, the first electrode EA and the second electrode EB of the light emitting element LD are arranged on the same side of the light emitting body EL. In other words, the light emitting element LD may be a lateral miniature light emitting diode, but it is not limited thereto. In some embodiments, the light emitting element LD may be a vertical miniature light emitting diode. The light emitting element LD may be manufactured on the growth substrate, and then transferred onto the first substrate 110 through a mass transfer process. The first electrode EA can serve as or be electrically connected to the anode of the light emitting element LD, and the second electrode EB can serve as or be electrically connected to the cathode of the light emitting element LD. The light-emitting body EL can include, for example, a stack of doped and undoped semiconductor materials, and the materials of the first electrode EA and the second electrode EB can include molybdenum, aluminum, titanium, copper, gold, silver or other conductive materials, or alloy combinations or stacked layers of two or more of the above materials, or other suitable materials.

The arrangement of the light emitting element LD may depend on the amount of light required by the first sensing element 120. For example, in this embodiment, the light emitting element LD can be arranged in an array on the first substrate 110, and the light emitting element LD may emit visible light (such as red light, green light or blue light) or invisible light (such as infrared light). When the light emitting element LD emits visible light, the first sensing element 120 may be a visible light sensing element, such as a fingerprint sensing element capable of sensing visible light. When the light emitting element LD emits invisible light, the first sensing element 120 may be an invisible light sensing element, such as a fingerprint sensing element capable of sensing infrared light. In some embodiments, the first sensing element 120 may be an organic photodiode.

In some embodiments, the sensing device 20 may also include a cover plate CV and an insulating layer 16, the cover plate CV may be disposed on the light emitting element LD, the insulating layer 16 may be located between the cover plate CV and the insulating layer 150, and the insulating layer 16 can be filled in the trench TR. When the finger FG is close to the cover plate CV, the light beam LR1 emitted by the light emitting element LD can enter the sensing layer SR1 of the first sensing element 120 through the second opening O2 and first opening O1 after being reflected by the finger FG, and the light beam LR2 emitted by the light emitting element LD can enter the sensing layer SR1 of the first sensing element 120 through the gap GP and the first opening O1 after being reflected by the finger FG, so that the first sensing element 120 can perform sensing mainly by receiving the reflected light of the light beam LR1 and the light beam LR2 reflected by the finger FG. It is worth noting that since the lateral light-shielding part 242 surrounds one end of the upper light-shielding part 241 on three sides, the lateral light-shielding part 242 can block the lateral light from the three sides of the lateral light-shielding part 142 away from the first sensing element 120, especially the strong light from a distance, so as to prevent the reflected light of the light beam LR1 and the light beam LR2 reflected by the finger FG from mixing with the strong light from the distance, thereby improving the signal-to-noise ratio of the first sensing element 120. In addition, the U-shaped profile of the gap GP can also adjust the light-receiving angle of the sensing layer SR1 with respect to the reflected light of the light beam LR2 reflected by the finger FG to specific angles on three sides.

Figure 3:
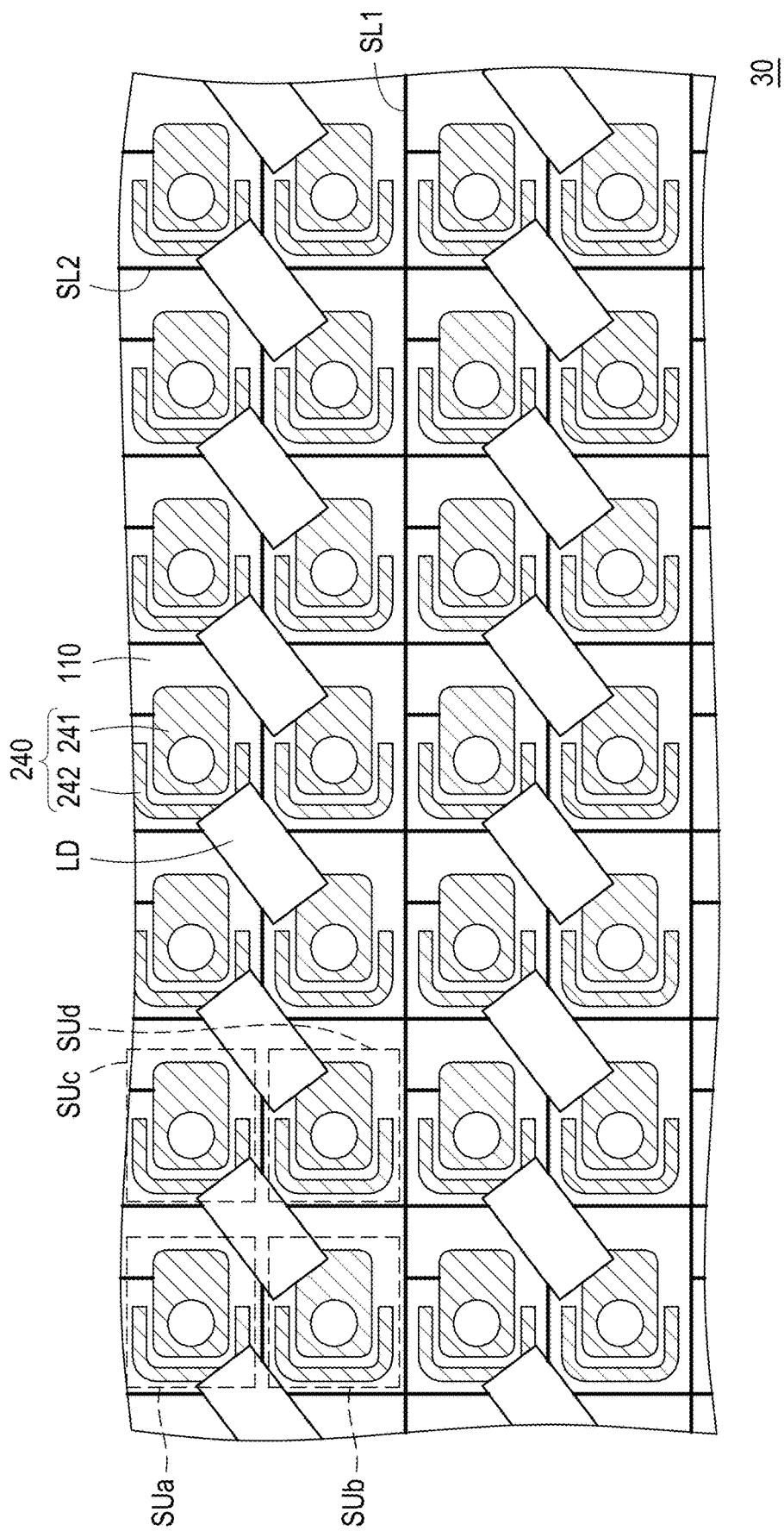
FIG. 3 is a schematic partial top view of a sensing device 30 according to an embodiment of the disclosure.

FIG. 3 is a schematic partial top view of a sensing device 30 according to an embodiment of the disclosure. The sensing device 30 may include: a first substrate 110, a second light-shielding layer 240, a light emitting element LD, and signal lines SL1 and SL2. Compared with the sensing device 20 as shown in FIG. 2A to FIG. 2B, the sensing device 30 shown in FIG. 3 is mainly different in that the light emitting elements LDs of the sensing device 30 can be arranged diagonally.

For example, in this embodiment, the sensing device 30 may include sensing units SUa-SUd, wherein the light emitting element LD may be configured between the sensing unit SUb and the sensing unit SUc, one electrode of the light emitting element LD can be electrically connected to the upper light-shielding part 241 of the sensing unit SUb, and the other electrode of the light emitting element LD can be electrically connected to the lateral light-shielding part 242 of the sensing unit SUc. As such, the light emitting elements LDs can be arranged on multiple sensing units in an oblique azimuth array according to the light-receiving angle and light-receiving amount required by the sensing element, thereby increasing the arrangement flexibility of the light emitting elements LDs.

Figure 4:
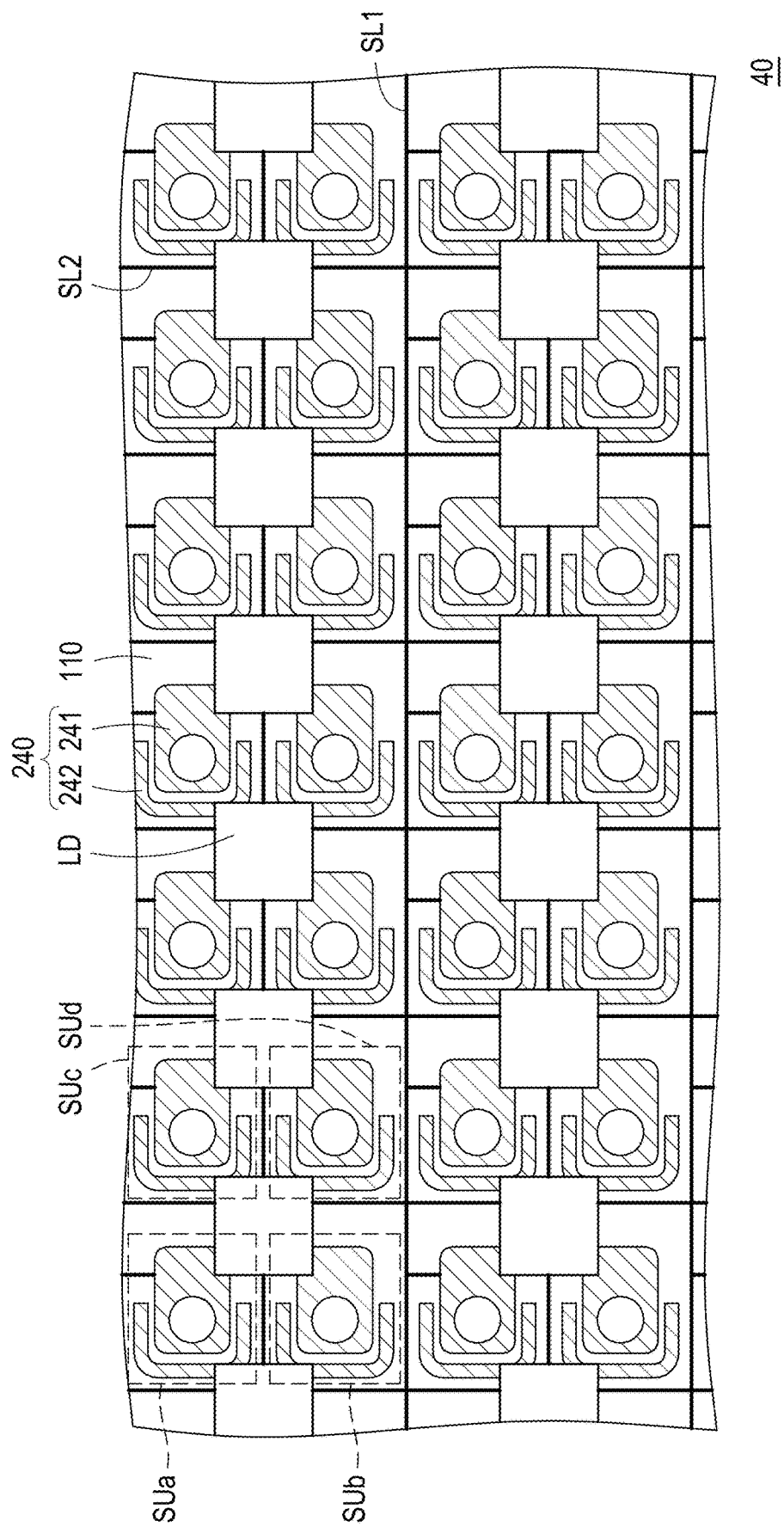
FIG. 4 is a schematic partial top view of a sensing device 40 according to an embodiment of the disclosure.

FIG. 4 is a schematic partial top view of a sensing device 40 according to an embodiment of the disclosure. The sensing device 40 may include: a first substrate 110, a second light-shielding layer 240, light emitting elements LDs, and signal lines SL1 and SL2. Compared with the sensing device 20 as shown in FIG. 2A to FIG. 2B, the sensing device 40 shown in FIG. 4 is mainly different in that the light emitting elements LDs of the sensing device 40 can connect four sensing units.

For example, in this embodiment, the light emitting element LD of the sensing device 40 may be connected between the sensing units SUa-SUd, in which one electrode of the light emitting element LD can be electrically connected to the upper light-shielding parts 241 of the sensing unit SUa and the sensing unit SUb, and the other electrode of the light emitting element LD can be electrically connected to the lateral light-shielding parts 242 of the sensing unit SUc and the sensing unit SUd. In this way, the light emitting elements LDs can be arrayed and arranged on multiple sensing units in a manner of straddling the four sensing units depending on the light-receiving angle and light-receiving amount required by the sensing element. In some embodiments, the sensing device 40 may also be locally provided with the light emitting elements LDs configured in an arrangement as shown in FIG. 2A or FIG. 3, thereby providing different sensing functions locally.

Figure 5:
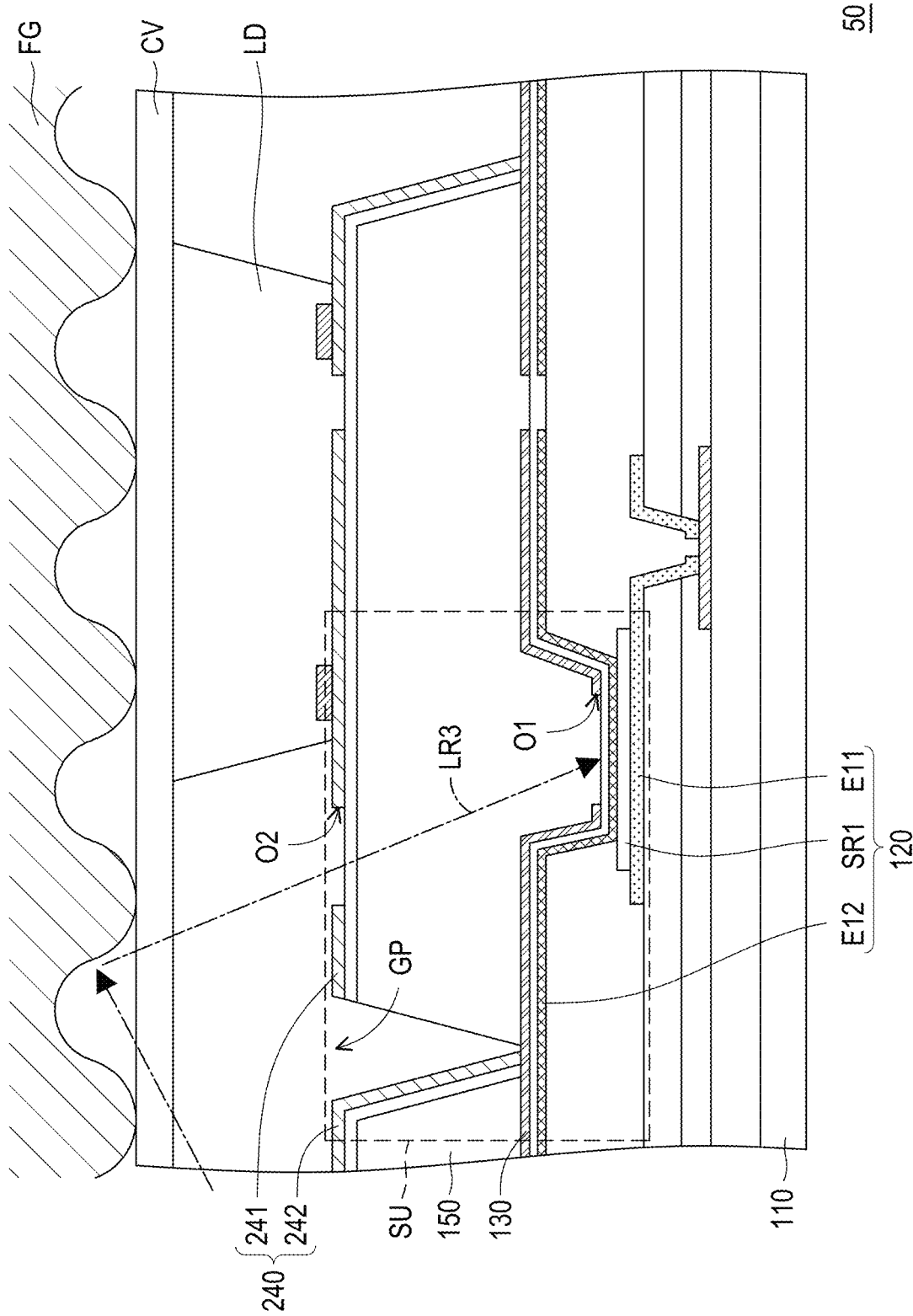
FIG. 5 is a schematic partial cross-sectional view of a sensing device 50 according to an embodiment of the disclosure.

FIG. 5 is a schematic partial cross-sectional view of a sensing device 50 according to an embodiment of the disclosure. In this embodiment, the sensing device 50 may include a first substrate 110, a first sensing element 120, a first light-shielding layer 130, a second light-shielding layer 240, an insulating layer 150, a light emitting element LD and a cover plate CV. Compared with the sensing device 20 as shown in FIG. 2A to FIG. 2B, the sensing device 50 shown in FIG. 5 is mainly different in that the light emitting element LD of the sensing device 50 can partially overlap the first sensing element 120.

For example, in this embodiment, the second opening O2 of the upper light-shielding part 241 of the second light-shielding layer 240 can be shifted laterally without overlapping the first opening O1 of the first light-shielding layer 130, so that the light emitting element LD can be shifted to the position that partially overlaps the sensing layer SR1 of the first sensing element 120. In this manner, the orthographic projection area of the sensing unit SU and the light emitting element LD on the first substrate 110 can be reduced, which means the footprint of the sensing unit SU and the light emitting element LD on the first substrate 110 can be reduced, so that a larger number of the sensing units SU and a larger number of the light emitting element LD can be provided on the first substrate 110 to improve the sensing resolution. In this case, the light beam LR3 reflected by the finger FG and passing through the second opening O2 and the first opening O1 can still obliquely enter the sensing layer SR1 of the first sensing element 120.

In some embodiments, the gap GP between the upper light-shielding part 241 and the lateral light-shielding part 242 of the second light-shielding layer 240 can be further reduced, so as to further reduce the overall layout area of the sensing unit SU and the light emitting element LD. In this case, the first sensing element 120 may not receive light through the gap GP, and the size of the gap GP only needs to keep the upper light-shielding part 241 and the lateral light-shielding part 242 electrically separated.

Figure 6A:
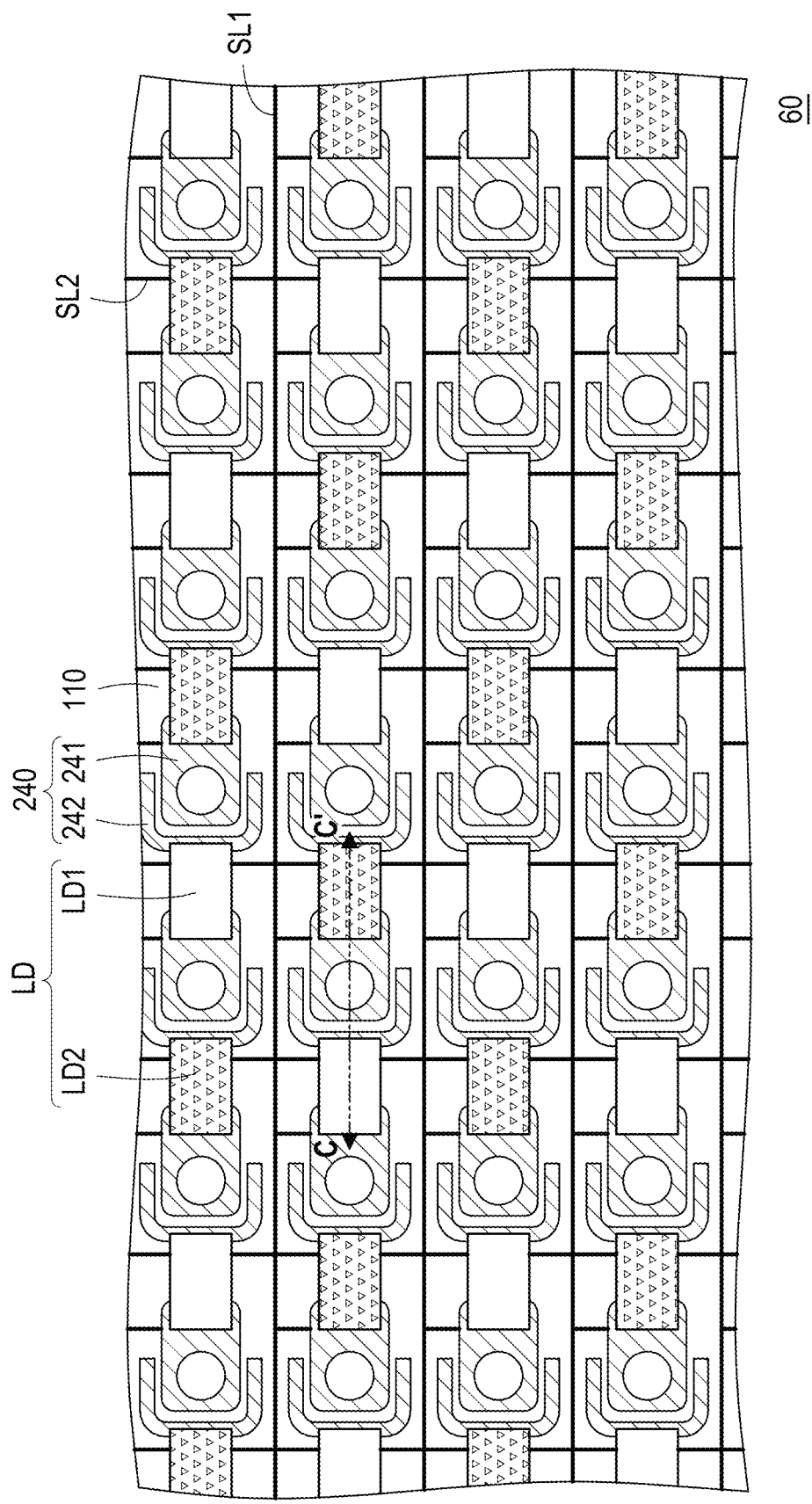
FIG. 6A is a schematic partial top view of a sensing device 60 according to an embodiment of the disclosure.
Figure 6B:
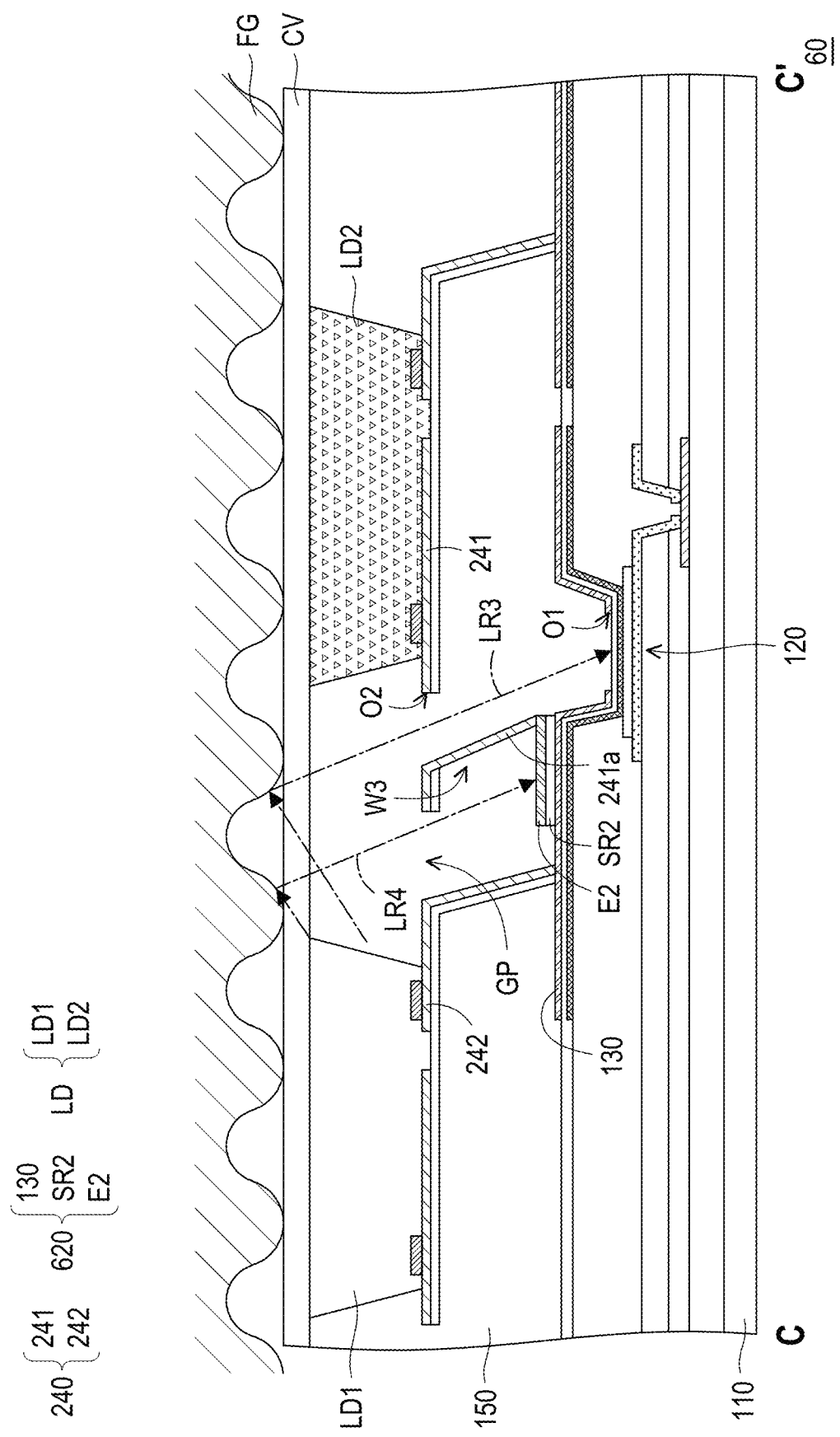
FIG. 6B is a schematic cross-sectional view taken along the section line C-C' of FIG. 6A.

FIG. 6A is a schematic partial top view of a sensing device 60 according to an embodiment of the disclosure. FIG. 6B is a schematic cross-sectional view taken along the section line C-C' of FIG. 6A. In this embodiment, the sensing device 60 may include a first substrate 110, a first sensing element 120, a first light-shielding layer 130, a second light-shielding layer 240, an insulating layer 150, a light emitting element LD and a cover plate CV. Compared with the sensing device 50 as shown in FIG. 5, the sensing device 60 shown in FIG. 6A to FIG. 6B is mainly different in that the sensing device 60 may further include a second sensing element 620.

For example, in this embodiment, the second sensing element 620 may be located between the first light-shielding layer 130 and the insulating layer 150, and the second sensing element 620 may include the first light-shielding layer 130, the sensing layer SR2 and the electrode E2, in which the first light-shielding layer 130 can be used as the lower electrode of the second sensing element 620, the electrode E2 can be used as the upper electrode of the second sensing element 620, the sensing layer SR2 can be located between the first light-shielding layer 130 and the electrode E2, and the electrode E2 can be electrically connected to the upper light-shielding part 241 of the second light-shielding layer 240.

In some embodiments, the upper light-shielding part 241 may further include an extension portion 241a, which may extend along the sidewall W3 of the insulating layer 150 to the electrode E2, so that the electrode E2 can be physically connected to the upper light-shielding part 241. In some embodiments, the orthographic projection of the gap GP between the upper light-shielding part 241 and the lateral light-shielding part 242 of the second light-shielding layer 240 on the first substrate 110 can partially overlap the orthographic projection of the sensing layer SR2 of the second sensing element 620 on the first substrate 110. In some embodiments, the orthographic projection of the gap GP on the first substrate 110 may not overlap the orthographic projection of the sensing layer SR2 on the first substrate 110.

In some embodiments, the second sensing element 620 can mainly receive the light beam LR4 reflected by the finger FG and passing through the gap GP. Since the extension portion 241a of the upper light-shielding part 241 extends toward the second sensing element 620 and is connected to the electrode E2, the extension portion 241a can also prevent the light beam LR4 passing through the gap GP from entering the first sensing element 120, so that the first sensing element 120 only receives the light beam LR3 reflected by the finger FG and passing through the second opening O2 and the first opening O1. In other words, the extension portion 241a can shield the first sensing element 120 from the side light coming from the side of the extension portion 241a away from the first sensing element 120, and the extension portion 241a and the lateral light-shielding part 242 can shield the second sensing element 620 from the surrounding side light, such that substantially only the light beam LR4 from above the second sensing element 620 and passing through the gap GP can enter the sensing layer SR2 of the second sensing element 620.

In this embodiment, the material of the sensing layer SR2 may be silicon-rich oxide doped with germanium, organic photodiodes or other suitable materials. The material of the electrode E2 is preferably a transparent conductive material, such as indium tin oxide, indium zinc oxide, aluminum tin oxide, aluminum zinc oxide, indium gallium zinc oxide or other suitable oxides, or a stacked layer of at least two of the above.

In some embodiments, the light emitting elements LDs of the sensing device 60 may include the light emitting elements LD1 and LD2, and the wavelength range of the light emitted by the light emitting element LD1 may be different from the wavelength range of the light emitted by the light emitting element LD2. For example, the light emitting element LD1 can emit visible light, such as red light, green light or blue light, and the light emitting element LD2 can emit invisible light, such as infrared light. The arrangement of the light emitting elements LD1 and LD2 is not particularly limited, and the arrangement of the light emitting elements LD1 and LD2 can be determined according to the light source and the amount of light required by the first sensing element 120 and the second sensing element 620. For example, when the first sensing element 120 is a visible light sensing element and the second sensing element 620 is an invisible light sensing element, the light emitting elements LD1 and LD2 can be alternately arranged over the first sensing element 120 and the second sensing element 620. In this way, with reference to FIG. 6B, for the first sensing element 120 and the second sensing element 620 disposed on the lower right side of the light emitting element LD1, the light beam LR3 reflected by the finger FG after being emitted by the light emitting element LD1 can be sensed by the first sensing element 120, but the light beam LR4 reflected by the finger FG after being emitted by the light emitting element LD1 cannot be sensed by the second sensing element 620. Similarly, for the first sensing element 120 and the second sensing element 620 disposed on the lower right side of the light emitting element LD2, the light beam reflected by the finger FG and passing through the second opening O2 and the first opening O1 after being emitted by the light emitting element LD2 cannot be sensed by the first sensing element 120, but the light beam reflected by the finger FG and passing through the gap GP after being emitted by the light emitting element LD2 can be sensed by the second sensing element 620.

Figure 7:
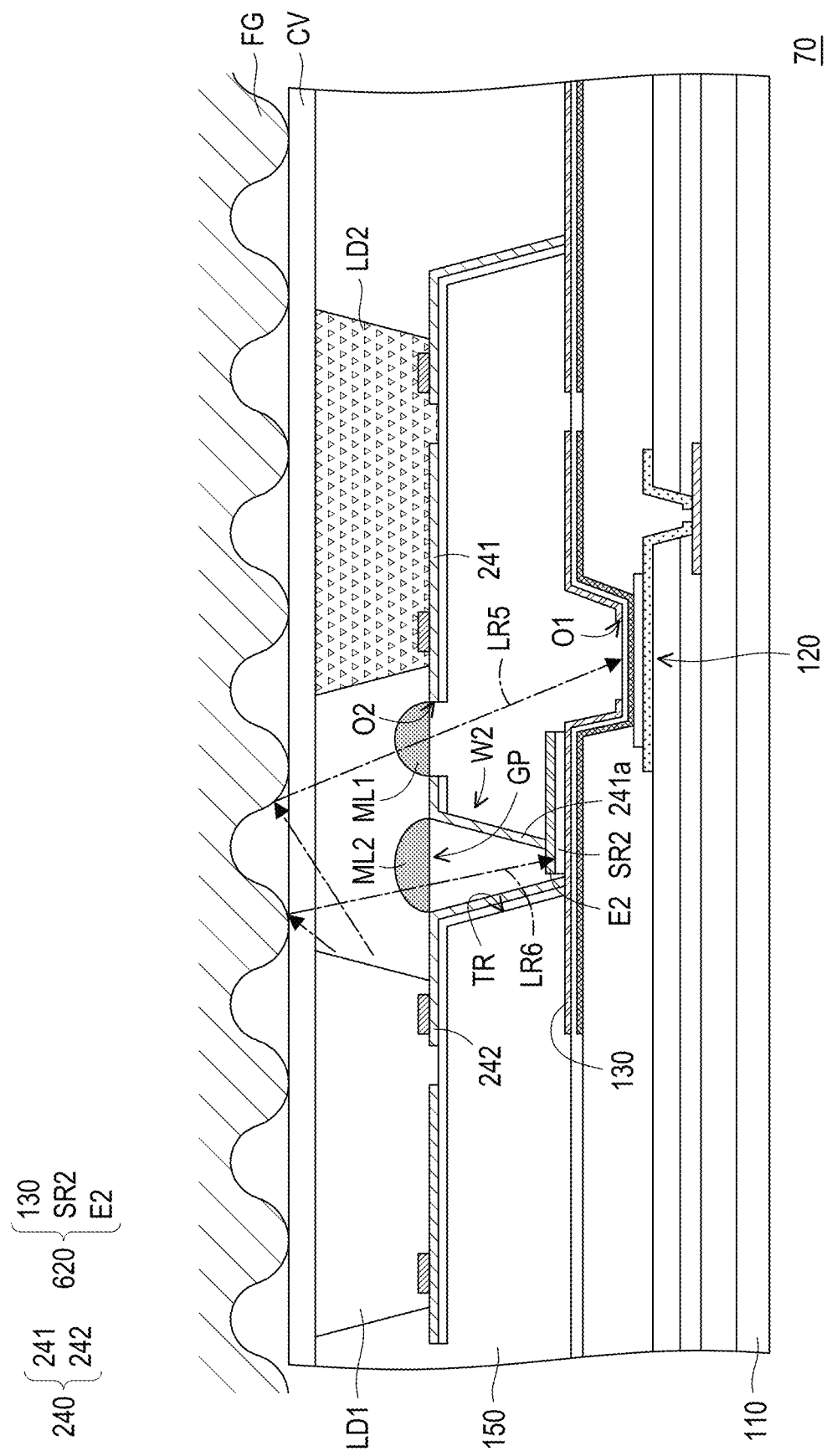
FIG. 7 is a schematic partial cross-sectional view of a sensing device 70 according to an embodiment of the disclosure.

FIG. 7 is a schematic partial cross-sectional view of a sensing device 70 according to an embodiment of the disclosure. In this embodiment, the sensing device 70 may include a first substrate 110, a first sensing element 120, a second sensing element 620, a first light-shielding layer 130, a second light-shielding layer 240, an insulating layer 150, light emitting elements LD1 and LD2 and a cover plate CV.

Compared with the sensing device 60 as shown in FIG. 6A to FIG. 6B, the sensing device 70 shown in FIG. 7 is mainly different in that the sensing device 70 may further include microlens structures ML1 and ML2. For example, in this embodiment, the microlens structure ML1 can be set in the second opening O2, and the microlens structure ML2 can be set in the gap GP. The microlens structures ML1 and ML2 may be lens structures with a thicker center than an edge, such as a symmetrical biconvex lens, an asymmetric biconvex lens, a plano-convex lens or a concave-convex lens. The microlens structure ML1 and ML2 can improve the optical focus point and light-receiving angle, and at the same time reduce the light leakage and light mixing problems caused by scattered light or refracted light, thereby reducing light loss and improving the signal-to-noise ratio of the first sensing element 120 and the second sensing element 620.

This embodiment is different from what is shown in FIG. 6B in that the extension portion 241a of the upper light-shielding part 241 can extend to the electrode E2 along the sidewall W2 of the trench TR of the insulating layer 150, so that the electrode E2 is physically connected to the upper light-shielding part 241, and the extension portion 241a is kept electrically separated from the lateral light-shielding part 242. In some embodiments, the second sensing element 620 may be located partially within the trench TR. In this way, the second sensing element 620 can mainly receive the light beam LR6 reflected by the finger FG and passing through the microlens structure ML2 and the gap GP. Since the extension portion 241a of the upper light-shielding part 241 extends toward the second sensing element 620 and is connected to the electrode E2, the extension portion 241a can prevent the light beam LR6 passing through the gap GP from entering the first sensing element 120, so that the first sensing element 120 only receives the light beam LR5 reflected by the finger FG and passing through the microlens structure ML1, the second opening O2 and the first opening O1. In other words, the extension portion 241a can shield the first sensing element 120 from the side light coming from the side of the extension portion 241a away from the first sensing element 120, and the extension portion 241a and the lateral light-shielding part 242 can shield the second sensing element 620 from the surrounding side light so that only the light beam LR6 passing through the gap GP can enter the sensing layer SR2.

Figure 8A:
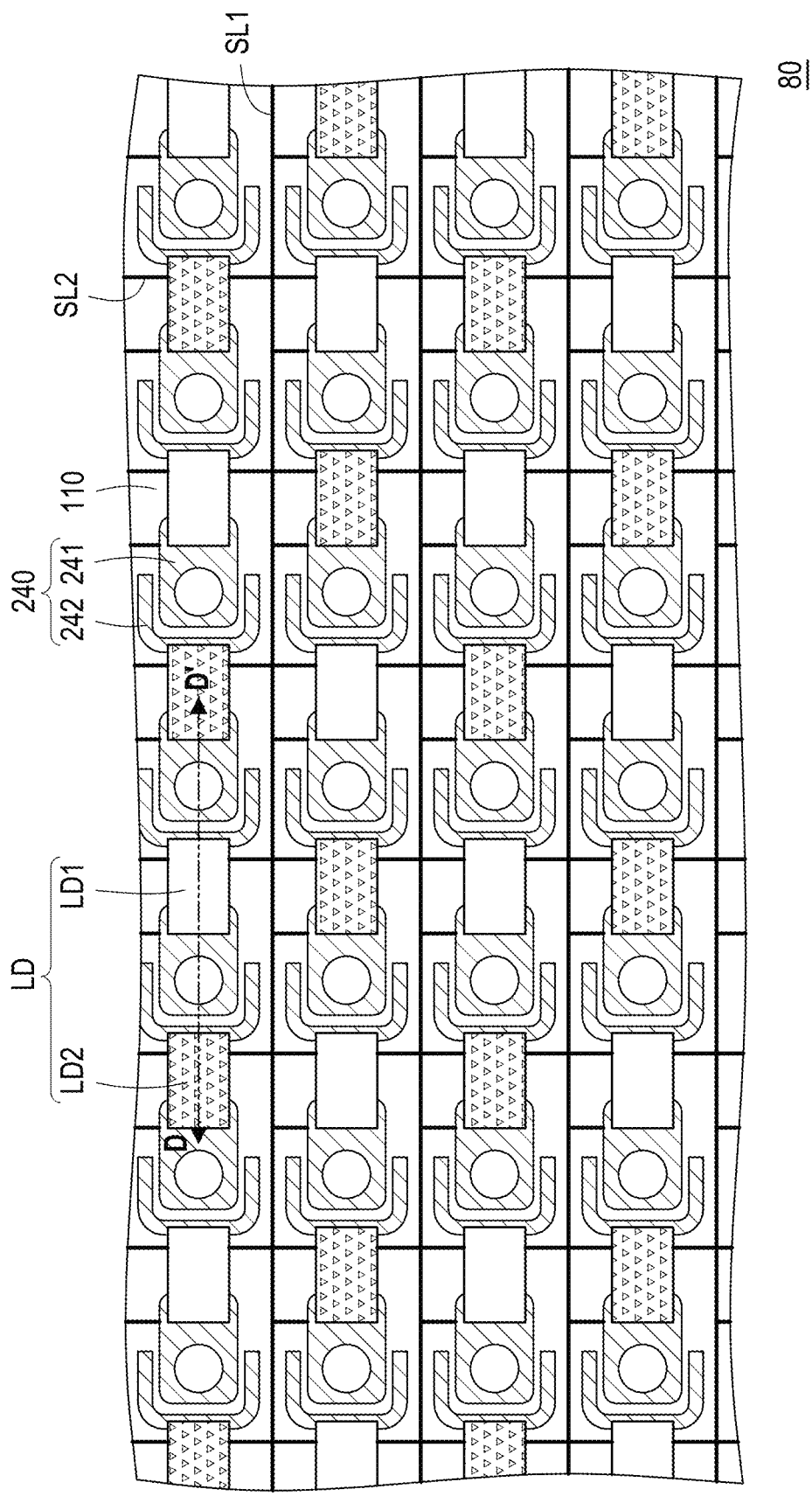
FIG. 8A is a schematic partial top view of a sensing device 80 according to an embodiment of the disclosure.
Figure 8B:
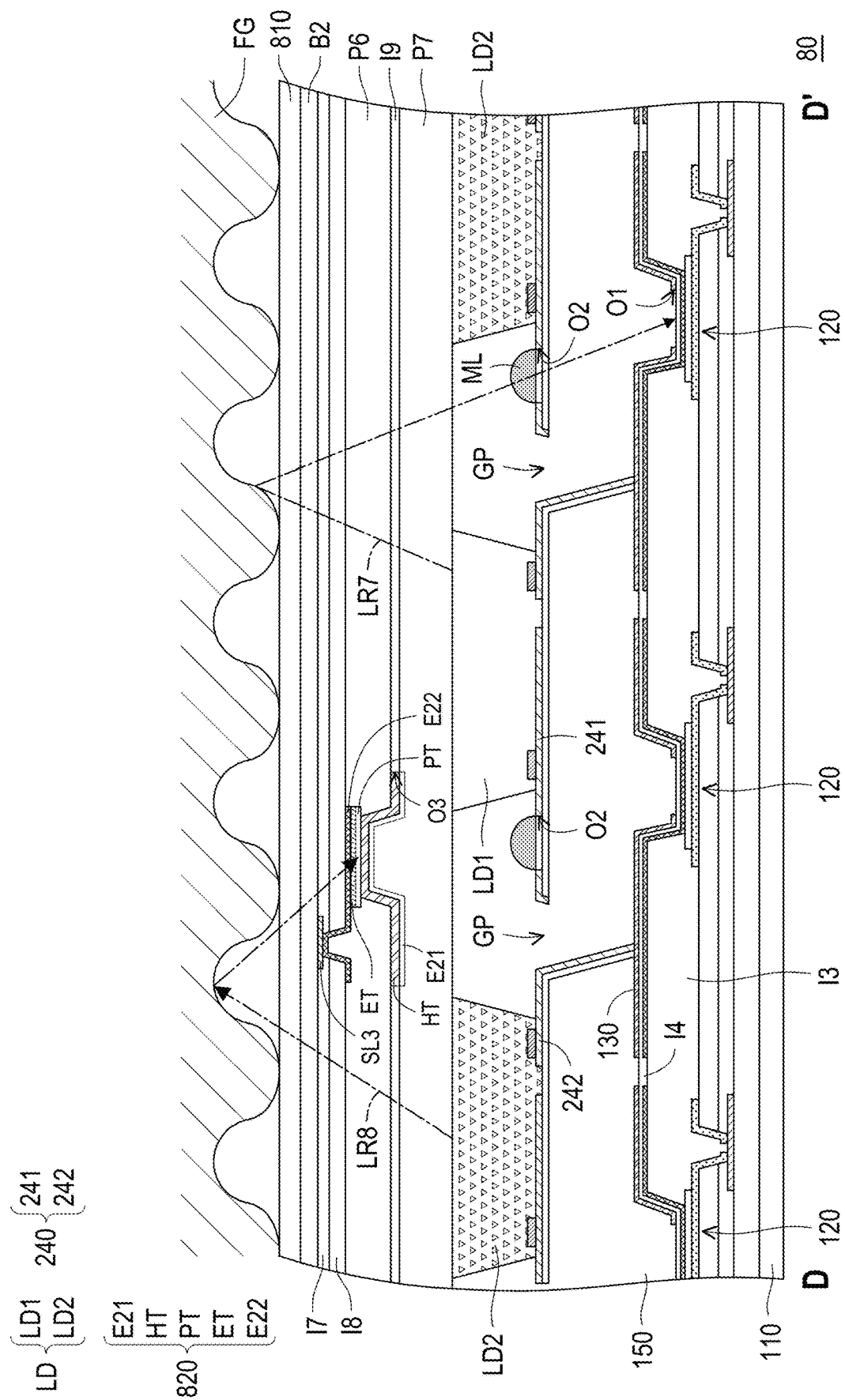
FIG. 8B is a schematic cross-sectional view taken along the section line D-D' of FIG. 8A.

FIG. 8A is a schematic partial top view of a sensing device 80 according to an embodiment of the disclosure. FIG. 8B is a schematic cross-sectional view taken along the section line D-D' of FIG. 8A. In this embodiment, the sensing device 80 may include a first substrate 110, a first sensing element 120, a first light-shielding layer 130, a second light-shielding layer 240, an insulating layer 150, and a light emitting element LD.

Compared with the sensing device 50 as shown in FIG. 5, the sensing device 80 shown in FIG. 8 is mainly different in that the sensing device 80 further includes a second substrate 810 and a third sensing element 820, in which the second substrate 810 is disposed over the light emitting element LD; the first sensing element 120, the light emitting element LD and the third sensing element 820 are located between the first substrate 110 and the second substrate 810, and the third sensing element 820 is disposed between the second substrate 810 and the second light-shielding layer 240.

In this embodiment, the third sensing element 820 may be located between the second substrate 810 and the light emitting element LD, and the first sensing element 120 and the third sensing element 820 may be respectively disposed on different or opposite sides of the light emitting element LD. The fabrication of the sensing device 80 can be completed by pairing and combining the first substrate 110 provided with the first sensing element 120 and the light emitting element LD with the second substrate 810 provided with the third sensing element 820 face to face. The dual-substrate design of the sensing device 80 can help prevent moisture and enhance structural stability, thereby improving the reliability of the sensing device 80.

In this embodiment, the third sensing element 820 may be an invisible light sensing element, such as an organic photodiode (OPD), for sensing blood oxygen concentration or heartbeat, or capturing vein images for use in living body anti-counterfeiting, or for capturing fingerprint images. For example, the third sensing element 820 may include an electrode E21, a hole transport layer HT, a photosensitive layer PT, an electron transport layer ET and an electrode E22, in which the electron transport layer ET, the photosensitive layer PT and the hole transport layer HT are located between the electrodes E21 and the electrodes E22, and the electron transport layer ET may be located between the photosensitive layer PT and the second substrate 810, but not limited thereto. In some embodiments, the hole transport layer HT may be located between the photosensitive layer PT and the second substrate 810. In addition, in some embodiments, both the first sensing element 120 and the third sensing element 820 may be invisible light sensing elements, and the sensing wavelength ranges of the first sensing element 120 and the third sensing element 820 may be different.

For example, the electrode E21 may comprise an opaque conductive material, such as a silver layer or an aluminum layer. The hole transport layer HT may include PEDOT:PSS (poly(3,4-ethylene-dioxythiophene:polystyrene sulfonate)) or high work function metal oxides, such as $MoO_3$. The photosensitive layer PT may include a photosensitive polymer that absorbs light in the infrared region and/or near-infrared (NIR) region, such as P3HT:PCBM (poly(3-hexyl-thiophene):[6,6]-phenyl-C61-butyric acid methyl ester) or PDPP3T-PCBM (poly-(diketopyrrole-terthiophene): [6,6]-phenyl-C61-butyric acid methyl ester). The electron transport layer ET may include zinc oxide (ZnO) or aluminum zinc oxide (AZO), and the material of the electrode E22 may be a transparent conductive material, such as indium tin oxide (ITO).

In some embodiments, the sensing device 80 may further include planarization layers P6, P7 and an insulating layer 19, in which the hole transport layer HT may be located in the opening O3 of the insulating layer 19, the planarization layer P6 may be located between the hole transport layer HT and the second substrate 810 and between the insulating layer 19 and the second substrate 810, and the planarization layer P7 may be located between the electrode E21 and the light emitting element LD and between the insulating layer 19 and the light emitting element LD.

In some embodiments, the sensing device 80 may further include a microlens structure ML, and the microlens structure ML may cover the second opening O2. In some embodiments, the sensing device 80 may further include a signal line SL3 disposed between the third sensing element 820 and the second substrate 810. The signal line SL3 may be electrically connected to the electrode E22 of the third sensing element 820, and the signal line SL3 can include, for example, a metal material with a low resistance. When the electrode E22 including the transparent conductive material has a large resistance value, the signal line SL3 helps to increase the signal transmission rate to the electrode E22.

In some embodiments, the sensing device 80 may further include a buffer layer B2, which may be disposed between the signal line SL3 and the second substrate 810. In some embodiments, the sensing device 80 may further include insulating layers 17, 18, and the insulating layers 17, 18 may be disposed between the signal line SL3 and the electrode E22 of the third sensing element 820 to avoid unnecessary electrical connection.

In this embodiment, the light emitting element LD of the sensing device 80 may include the light emitting element LD1, which may emit visible light, and the light emitting element LD2, which may emit invisible light, but the disclosure is not limited thereto. In some embodiments, the light emitting element LD1 and the light emitting element LD2 can emit visible light of different colors, such as red light, green light, blue light or white light. In some embodiments, the light emitting elements LD1 and LD2 can emit invisible light with different wavelengths.

The arrangement of the light emitting elements LD1 and LD2 may depend on the amount of light required by the first sensing element 120 and the third sensing element 820. For example, the light emitting elements LD1 and LD2 can be arranged alternately, and when the user touches the second substrate 810 with his or her finger FG to perform sensing for, for example, fingerprints, vein images, blood oxygen concentration, blood pressure, heartbeat, etc., the visible light LR7 emitted by the light emitting element LD1 can pass through the microlens structure ML, the second opening O2 and the first opening O1 after being reflected by the finger FG, and then enter the first sensing element 120, and the invisible light LR8 emitted by the light emitting element LD2 can be reflected by the finger FG and then reach the third sensing element 820, so that the third sensing element 820 can cooperate with the light emitting element LD2 to locally provide functions such as fingerprint recognition, living body anti-counterfeiting, or blood oxygen concentration sensing. Since the third sensing element 820 is very close to the finger FG, the third sensing element 820 does not need to be equipped with a light collimation structure, but the disclosure is not limited thereto.

Figure 9A:
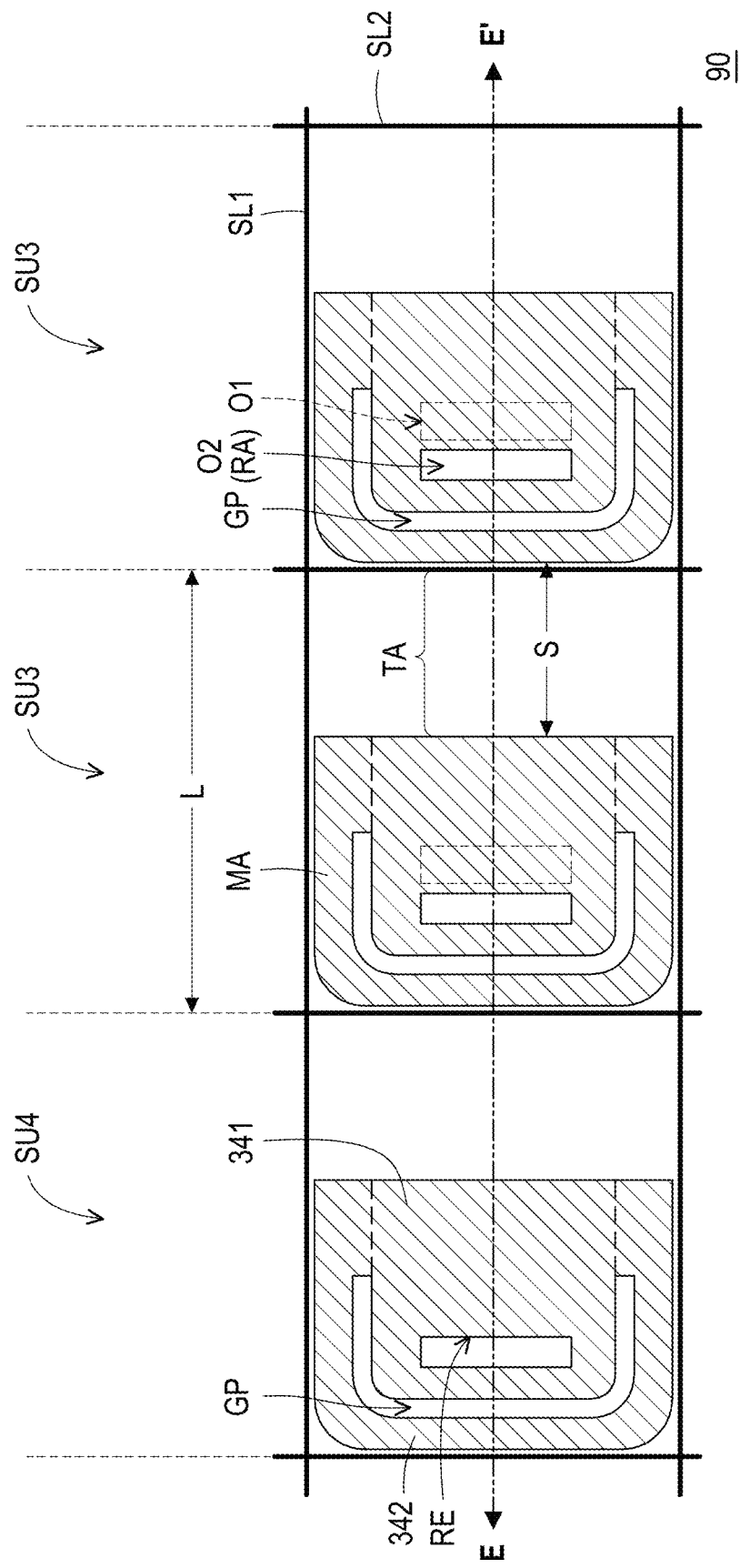
FIG. 9A is a schematic partial top view of a sensing device 90 according to an embodiment of the disclosure.
Figure 9B:
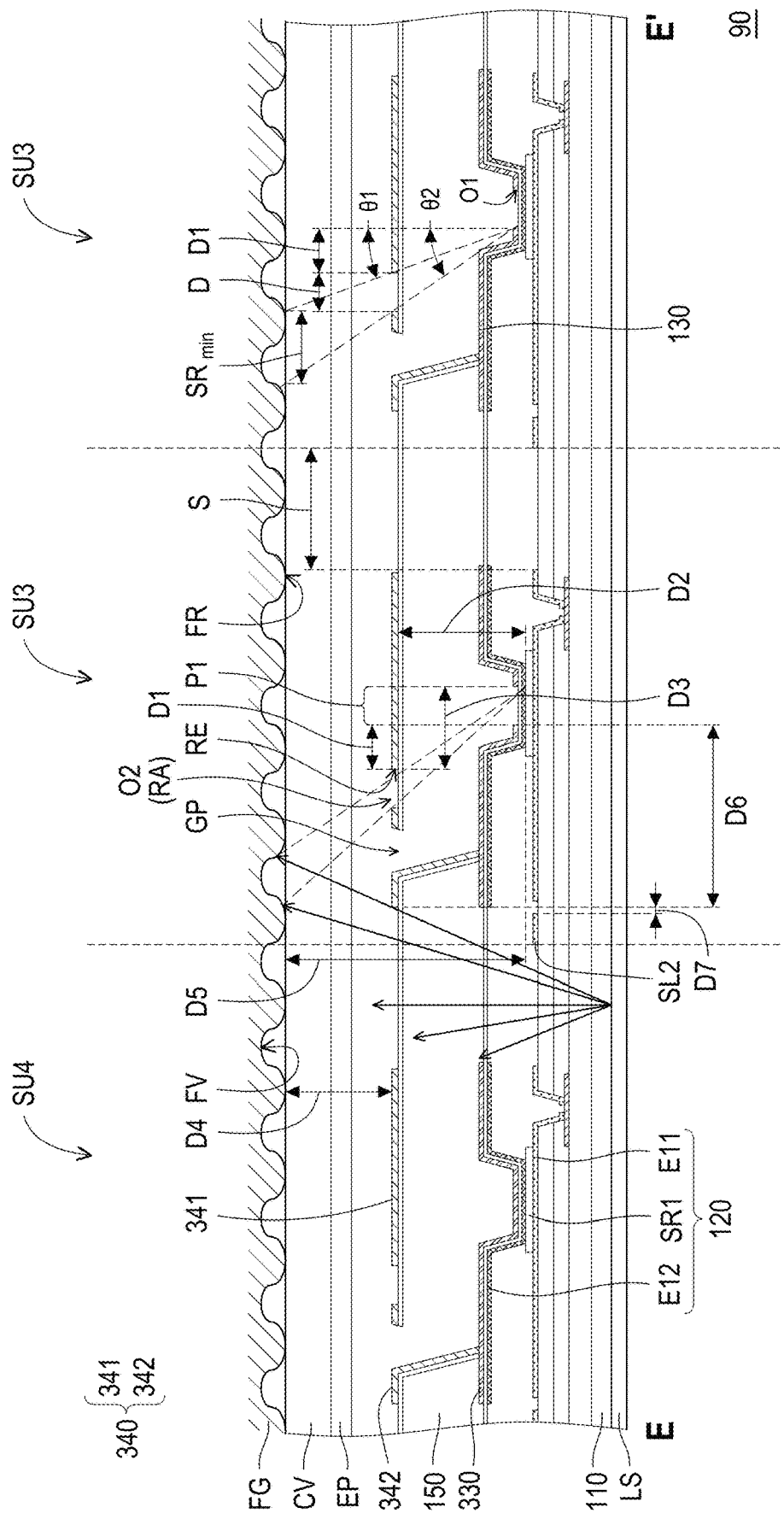
FIG. 9B is a schematic cross-sectional view taken along the section line E-E' of FIG. 9A.

FIG. 9A is a schematic partial top view of a sensing device 90 according to an embodiment of the disclosure. FIG. 9B is a schematic cross-sectional view taken along the section line E-E' of FIG. 9A. In this embodiment, the sensing device 90 may include a first substrate 110, a first sensing element 120, a first light-shielding layer 130, a second light-shielding layer 340, an insulating layer 150, a light source LS, and signal lines SL1, SL2. The first sensing element 120 is disposed over the first substrate 110 and includes a first electrode E11; a second electrode E12 disposed over the first electrode E11; and a sensing layer SR1 disposed between the first electrode E11 and the second electrode E12. The first light-shielding layer 130 is disposed on the first sensing element 120. The second light-shielding layer 340 is disposed over the first light-shielding layer 130 and has a light-receiving region RA and a light-receiving edge RE adjacent to the light-receiving region RA. The insulating layer 150 is disposed between the first light-shielding layer 130 and the second light-shielding layer 340. The light source LS is disposed on a side of the first substrate 110 away from the first sensing element 120. The signal lines SL1 and SL2 can provide gate signals or serve as data lines, for example.

In this embodiment, the sensing device 90 may include a plurality of sensing units SU3, the sensing unit SU3 includes a first sensing element 120, a first light-shielding layer 130 and a second light-shielding layer 340, the first light-shielding layer 130 in the sensing unit SU3 has a first opening O1, and the first opening O1 overlaps the first electrode E11, the sensing layer SR1 and second electrode E12. In some embodiments, the sensing device 90 may further include a reference sensing unit SU4. The reference sensing unit SU4 includes a first sensing element 120, a second light-shielding layer 340, and a third light-shielding layer 330. The position of the third light-shielding layer 330 relative to the first sensing element 120 and the second light-shielding layer 340 in the reference sensing unit SU4 is the same as the position of the first light-shielding layer 130 relative to the first sensing element 120 and the second light-shielding layer 340 in the sensing unit SU3, and the third light-shielding layer 330 in the reference sensing unit SU4 does not have the first opening O1 so that the reference sensing unit SU4 can be used to sense background stray light. In this way, an algorithm can be used to subtract the detection signal of the reference sensing unit SU4 from the detection signal of the sensing unit SU3, thereby reducing the error caused by the background noise.

In this embodiment, the second light-shielding layer 340 may include an upper light-shielding part 341 and a lateral light-shielding part 342, there is a gap GP between the upper light-shielding part 341 and the lateral light-shielding part 342, and the lateral light-shielding part 342 can be connected to the upper light-shielding part 341. The upper light-shielding part 341 can have a second opening O2. Because the second opening O2 can be cooperated with the first opening O1 to be used as the light collimation structure of the first sensing element 120, the second opening O2 can also be defined as the light-receiving region RA of the second light-shielding layer 340, and the edge of the upper light-shielding part 341 adjacent to the second opening O2 can be defined as the light-receiving edge RE of the second light-shielding layer 340. In other words, the light-receiving edge RE can be adjacent to the second opening O2.

In this embodiment, the ratio of the minimum spacing D1 between the orthographic projection P1 of the first opening O1 on the second light-shielding layer 340 and the light-receiving edge RE to the maximum spacing D2 between the second light-shielding layer 340 and the sensing layer SR1 may range from 0.3 to 0.85, that is, 0.3≤D1/D2≤0.85. For example, D1/D2 may be 0.4, 0.6 or 0.8. In this way, the amount of light that enters the sensing layer SR1 after leaving the light source LS and being reflected by the fingerprint valleys FV of the finger FG can be reduced, and the ratio of the amount of light reflected by the fingerprint ridges FR of the finger FG to the amount of light reflected by the fingerprint valleys FV can be further increased, thereby improving the image contrast of the sensing device 90 in fingerprint sensing.

In some embodiments, a ratio (D3/D2) of the spacing D3 between the side of the orthographic projection P1 of the first opening O1 on the second light-shielding layer 340 farthest from the light-receiving edge RE and the light-receiving edge RE to the maximum spacing D2 between the second light-shielding layer 340 and the sensing layer SR1 can range from 0.3 to 1.8. For example, D3/D2 can be 0.5, 1.0 or 1.5, so as to reduce the proportion of light reflected by the fingerprint valley FV in the light entering the sensing layer SR1, and the ratio of the amount of light reflected by the fingerprint ridges FR of the finger FG to the amount of light reflected by the fingerprint valleys FV can be further increased, thereby improving the image contrast of the sensing device 90 in fingerprint sensing.

In some embodiments, the minimum spacing D1 may be greater than 0 μm and less than 8 μm, such as 2 μm, 4 μm or 6 μm. In some embodiments, the maximum spacing D2 may be greater than 2 μm and less than 22 μm, such as 5 μm, 10 μm or 20 μm. In some embodiments, the spacing D3 may be greater than 0 μm and less than 24 μm, such as 8 μm, 12 μm or 22 μm.

In some embodiments, the sensing device 90 may further include a cover plate CV and an encapsulation layer EP, and the encapsulation layer EP may be located between the cover plate CV and the second light-shielding layer 340. For example, the encapsulation layer EP can block moisture for the second light-shielding layer 340, and the cover plate CV can constitute the upper surface of the sensing device 90.

In some embodiments, there may be a distance D4 between the second light-shielding layer 340 and the upper surface of the sensing device 90, a distance D5 may exist between the sensing layer SR1 and the upper surface of the sensing device 90, and the light-receiving region RA of the second light-shielding layer 340 (or the second opening O2) may have a light-receiving distance D. In order to avoid signal crosstalk between the light-receiving regions of adjacent sensing units, the minimum light-receiving range $SR_{min}$ of the sensing unit SU3 is preferably not less than the distance D4. Therefore, the following relationship can be obtained:

$$SR_{min}=D5(\tan\theta2-\tan\theta1)=D5[(D1+D)/D2-D1/D2]$$
$$=D5(D/D2)\geq D4$$

Therefore, D/D2≥D4/D5. In other words, the ratio of the light-receiving distance D of the light-receiving region RA (or the second opening O2) to the maximum spacing D2 between the second light-shielding layer 340 and the sensing layer SR1 is preferably greater than or equal to the ratio of the distance D4 between the second light-shielding layer 340 and the upper surface of the sensing device 90 to the distance D5 between the sensing layer SR1 and the upper surface of the sensing device 90.

In some embodiments, the distance D4 may be greater than 0 μm and less than 125 μm, such as 30 μm, 70 μm or 110 μm. In some embodiments, the distance D5 may be greater than 2 μm and less than 150 μm, such as 40 μm, 80 μm or 120 μm.

In some embodiments, the sensing unit SU3 may have an opaque area MA and a light-transmissive area TA, wherein the opaque area MA may be the area where the first light-shielding layer 130, the second light-shielding layer 340 and the signal line SL2 exist, and the area where the first light-shielding layer 130, the second light-shielding layer 340 and the signal line SL2 do not exist is the light-transmissive area TA. In addition, the sensing unit SU3 may have a length L along the direction of the signal line SL1, and the length L may be the spacing between the centers of two adjacent first opening O1. The light-transmissive area TA may have a width S along the direction of the signal line SL1. In other words, the width S is the smaller of the spacing between the orthographic projection of the signal line SL2 on the first light-shielding layer 130 and the first light-shielding layer 130 and the spacing between the orthographic projection of the signal line SL2 on the second light-shielding layer 340 and the second light-shielding layer 340. In some embodiments, the width S is preferably greater than or equal to zero and less than or equal to half of the length L, i.e. 0≤S≤1/2L.

In some embodiments, in the sensing unit SU3, the spacing D6 between the orthographic projection of the first opening O1 on the upper surface of the first light-shielding layer 130 and the end of the first light-shielding layer 130 close to the signal line SL2 may be greater than or equal to the spacing D7 between the orthographic projection of the signal line SL2 on the first light-shielding layer 130 and the first light-shielding layer 130 for facilitating the reception of fingerprint-reflected light signals at large angles. In some embodiments, the orthographic projection of the signal line SL2 on the first light-shielding layer 130 may be adjacent to the first light-shielding layer 130. In other words, the spacing D7 may be zero to minimize stray light at small angles.

Figure 10A:
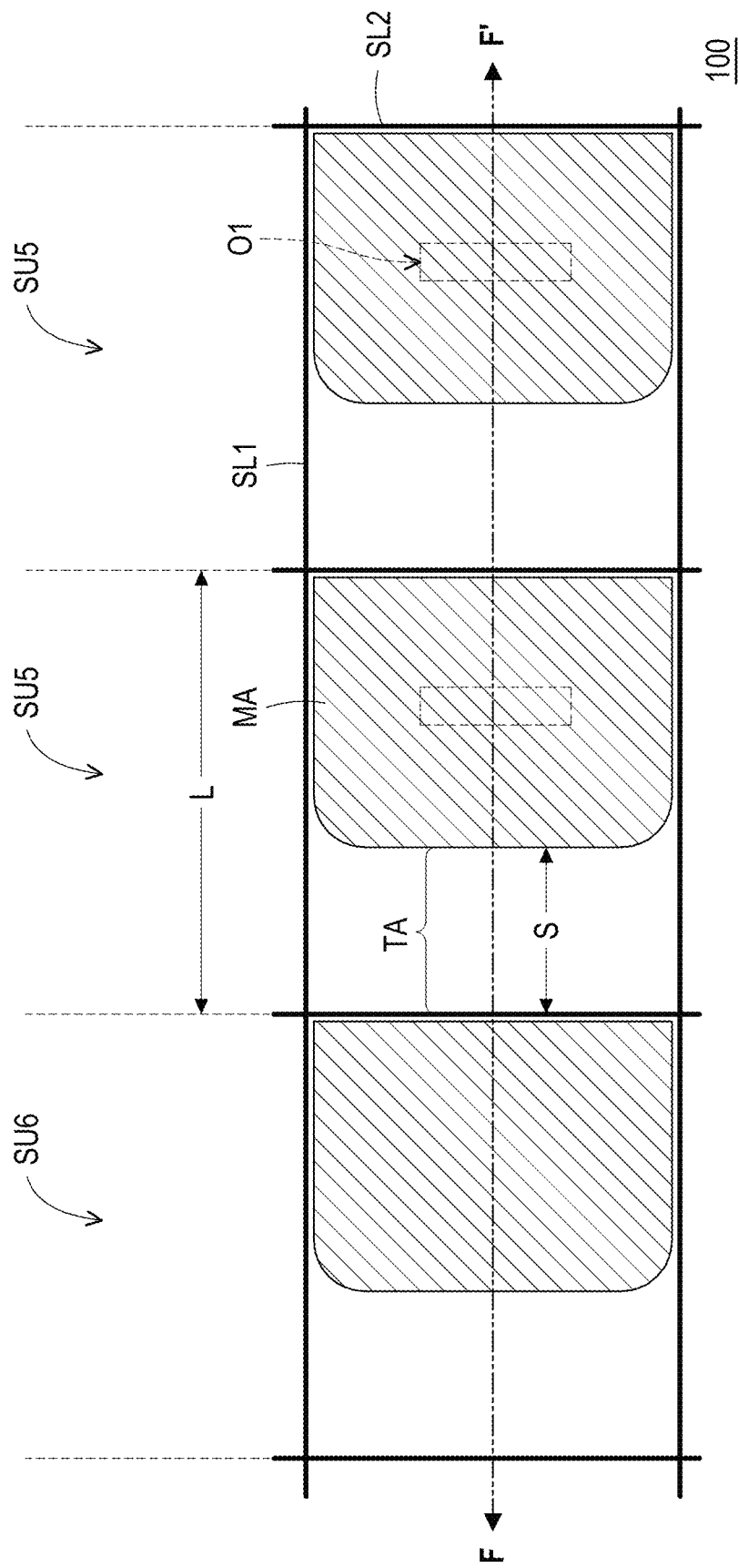
FIG. 10A is a schematic partial top view of a sensing device 100 according to an embodiment of the disclosure.
Figure 10B:
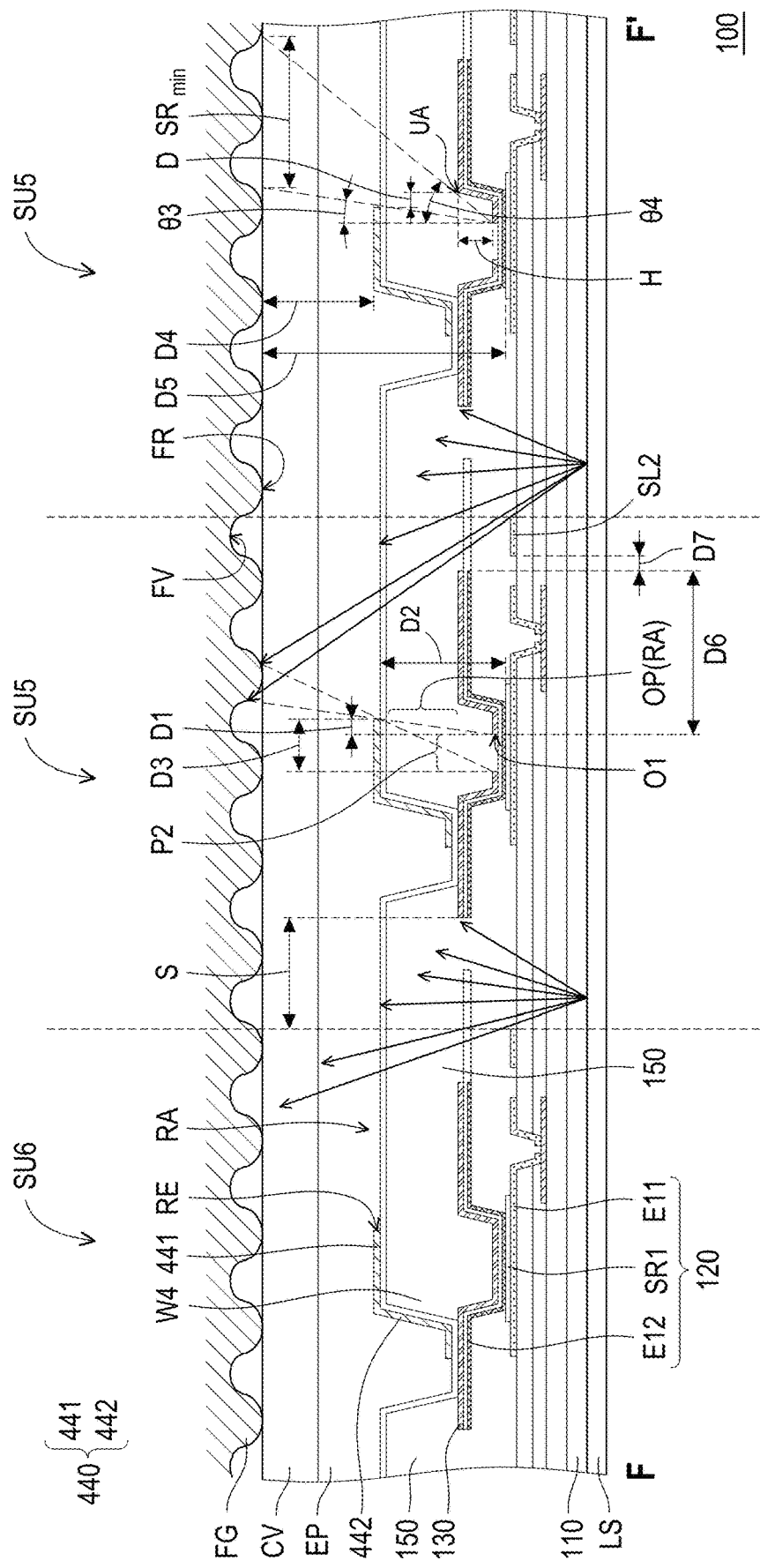
FIG. 10B is a schematic cross-sectional view taken along the section line F-F' of FIG. 10A.
Figure 10C:
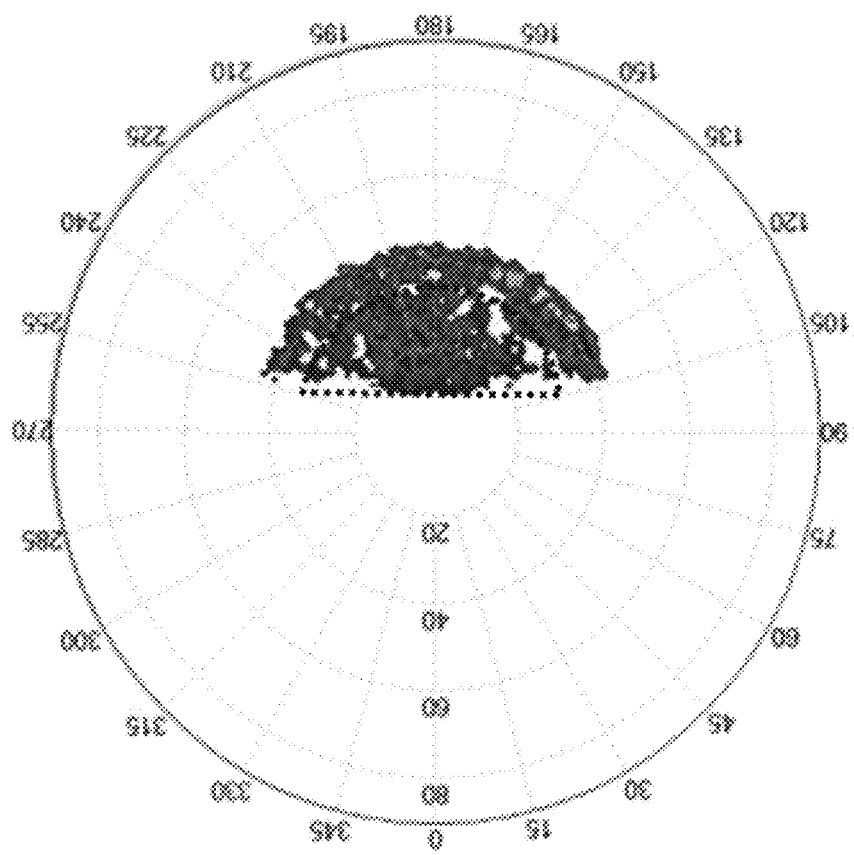
FIG. 10C is a simulation diagram of the distribution of light received by the sensing device 100 of FIG. 10A at positions with different light-receiving angles corresponding to different light incident angles.

FIG. 10A is a schematic partial top view of a sensing device 100 according to an embodiment of the disclosure. FIG. 10B is a schematic cross-sectional view taken along the section line F-F' of FIG. 10A. FIG. 10C is a simulation diagram of the distribution of light received by the sensing device 100 of FIG. 10A at positions with different light-receiving angles corresponding to different light incident angles.

With reference to both FIG. 10A and FIG. 10B, the sensing device 100 may include a first substrate 110, a first sensing element 120, a first light-shielding layer 130, a second light-shielding layer 440, an insulating layer 150, a light source LS and signal lines SL1, SL2. The first sensing element 120 is disposed over the first substrate 110, and includes a first electrode E11; a second electrode E12, disposed over the first electrode E11; and a sensing layer SR1 disposed between the first electrode E11 and the second electrode E12. The first light-shielding layer 130 is disposed on the first sensing element 120, and the second light-shielding layer 440 is disposed over the first light-shielding layer 130 and has a light-receiving region RA and a light-receiving edge RE adjacent to the light-receiving region RA. The insulating layer 150 is disposed between the first light-shielding layer 130 and the second light-shielding layer 440. The light source LS is disposed on the side of the first substrate 110 away from the first sensing element 120.

In this embodiment, the sensing device 100 may include a plurality of sensing units SU5, in which the first light-shielding layer 130 of the sensing unit SU5 has a first opening O1, and the first opening O1 overlaps the first electrode E11, the sensing layer SR1 and the second electrode E12. In some embodiments, the sensing device 100 may further include a reference sensing unit SU6, and the first light-shielding layer 130 in the reference sensing unit SU6 does not have a first opening O1. Therefore, the reference sensing unit SU6 may be used to sense background stray light. In this way, an algorithm can be used to subtract the detection signal of the reference sensing unit SU6 from the detection signal of the sensing unit SU5 to reduce the error caused by the background noise.

In this embodiment, the second light-shielding layer 440 may include an upper light-shielding part 441 and a lateral light-shielding part 442, in which the upper light-shielding part 441 is disposed on the insulating layer 150, the lateral light-shielding part 442 can be connected to the upper light-shielding part 441, and the lateral light-shielding part 442 can extend toward the first sensing element 120 along the sidewall W4 of the insulating layer 150, so that the second light-shielding layer 440 can block the light from directly above the first sensing element 120 and obliquely incident at a small angle, and the light reflected by the finger FG can only enters the sensing layer SR1 of the first sensing element 120 through the lateral transparent opening OP in the insulating layer 150 between the second light-shielding layer 440 and the first light-shielding layer 130. In this way, only light with a large oblique angle can enter the sensing layer SR1 through the opening OP and the first opening O1. Therefore, the opening OP can also be defined as the light-receiving region RA of the second light-shielding layer 340, and the edge of the upper light-shielding part 441 adjacent to the opening OP can be defined as the light-receiving edge RE of the second light-shielding layer 440.

In this embodiment, the ratio of the minimum spacing D1 between the orthographic projection P2 of the first opening O1 on the second light-shielding layer 440 and the light-receiving edge RE to the maximum spacing D2 between the second light-shielding layer 440 and the sensing layer SR1 can range from 0.3 to 0.85, i.e. $0.3 \leq D1/D2 \leq 0.85$. For example, D1/D2 may be 0.4, 0.6 or 0.8. In this way, increasing D1 can reduce the amount of light that enters the sensing layer SR1 after leaving the light source LS and being reflected by the fingerprint valley FV of the finger FG, and the ratio of the amount of light reflected by the fingerprint ridges FR of the finger FG to the amount of light reflected by the fingerprint valleys FV can be further increased, thereby improving the image contrast of the sensing device 100 in fingerprint sensing.

In some embodiments, the ratio (D3/D2) of the spacing D3 between the side of the orthographic projection P2 of the first opening O1 on the second light-shielding layer 440 farthest from the light-receiving edge RE and the light-receiving edge RE to the maximum spacing D2 between the second light-shielding layer 440 and the sensing layer SR1 can range from 0.3 to 1.8, preferably 0.85 to 1.8. For example, D3/D2 can be 0.5, 1.0 or 1.5, so as to reduce the proportion of light reflected by the fingerprint valley FV in the light entering the sensing layer SR1, and the ratio of the amount of light reflected by the fingerprint ridges FR of the finger FG to the amount of light reflected by the fingerprint valleys FV can be further increased, thereby improving the image contrast of the sensing device 100 in fingerprint sensing.

In some embodiments, the sensing device 100 may further include a cover plate CV and an encapsulation layer EP, the encapsulation layer EP may be disposed between the cover plate CV and the second light-shielding layer 440. For example, the encapsulation layer EP can block moisture for the second light-shielding layer 440, and the cover plate CV can constitute the upper surface of the sensing device 100.

In some embodiments, there may be a distance D4 between the second light-shielding layer 440 and the upper surface of the sensing device 100; there may be a distance D5 between the sensing layer SR1 and the upper surface of the sensing device 100; a height difference H may exist between the upper surface of the first light-shielding layer 130 and the first opening O1; the light-receiving region RA of the second light-shielding layer 440 may have a light-receiving distance D; and the light-receiving distance D may be the spacing between the orthographic projection of the corner UA of the first light-shielding layer 130 on the second light-shielding layer 440 and the light-receiving edge RE. In order to avoid signal crosstalk between the light-receiving regions of adjacent sensing units, the minimum light-receiving range $SR_{min}$ of the sensing unit SU5 is preferably not less than the distance D4. Therefore, the following relationship can be obtained:

$$SR_{min} = D5(\tan \theta 4 - \tan \theta 3) = D5[(D1+D)/H - D1/H]$$
$$= D5(D/H) \geq D4$$

Therefore, $D/H \geq D4/D5$. In other words, the ratio of the light-receiving distance D of the light-receiving region RA to the height difference H between the upper surface of the first light-shielding layer 130 and the first opening O1 is preferably greater than or equal to the ratio of the distance D4 between the second light-shielding layer 440 and the upper surface of the sensing device 100 to the distance D5 between the sensing layer SR1 and the upper surface of the sensing device 100.

In some embodiments, the sensing unit SU5 may have an opaque area MA and a light-transmissive area TA, wherein the opaque area MA may be the area where the first light-shielding layer 130, the second light-shielding layer 440 and the signal line SL2 exist, and the area where the first light-shielding layer 130, the second light-shielding layer 440 and the signal line SL2 do not exist is the light-transmissive area TA. In certain embodiments, the sensing unit SU5 may have a length L along the direction of the signal line SL1, the light-transmissive area TA may have a width S along the direction of the signal line SL1, and the width S may be half the length L, i.e. S=1/2L.

In this embodiment, in the sensing unit SU5, the spacing D6 between the orthographic projection of the first opening O1 on the upper surface of the first light-shielding layer 130 and the end of the first light-shielding layer 130 close to the signal line SL2 may be greater than or equal to the spacing D7 between the orthographic projection of the signal line SL2 on the first light-shielding layer 130 and the first light-shielding layer 130. The spacing D7 is close to zero. For example, the spacing D7 is about 0.3 μm. It can be seen from the simulated light distribution diagram of FIG. 10C that the amount of stray light at small angles is significantly reduced.

Figure 11A:
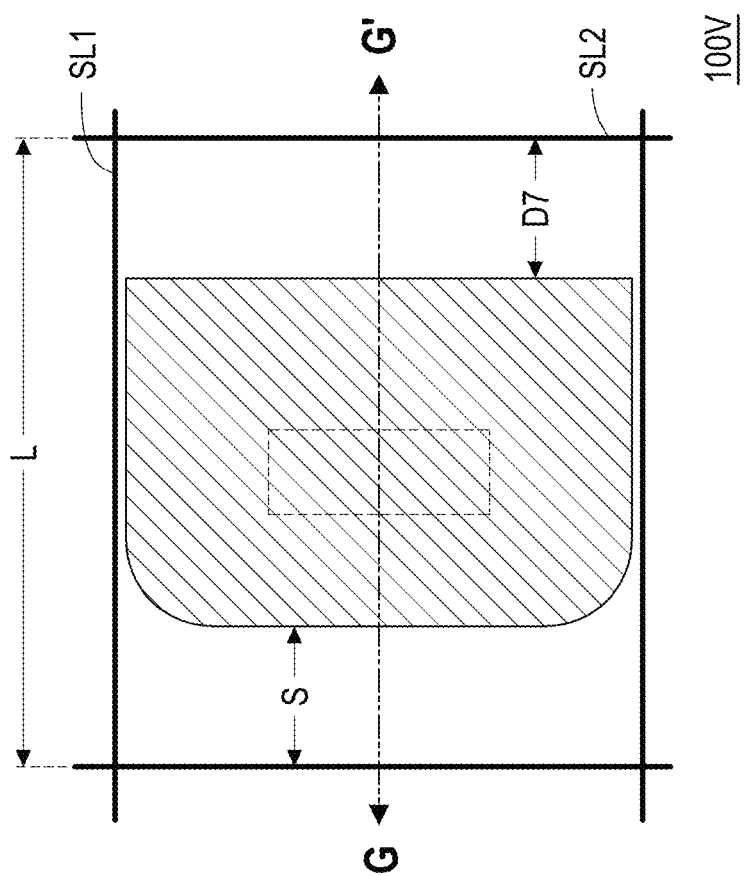
FIG. 11A is a schematic partial top view of a sensing device 100V according to an embodiment of the disclosure.
Figure 11B:
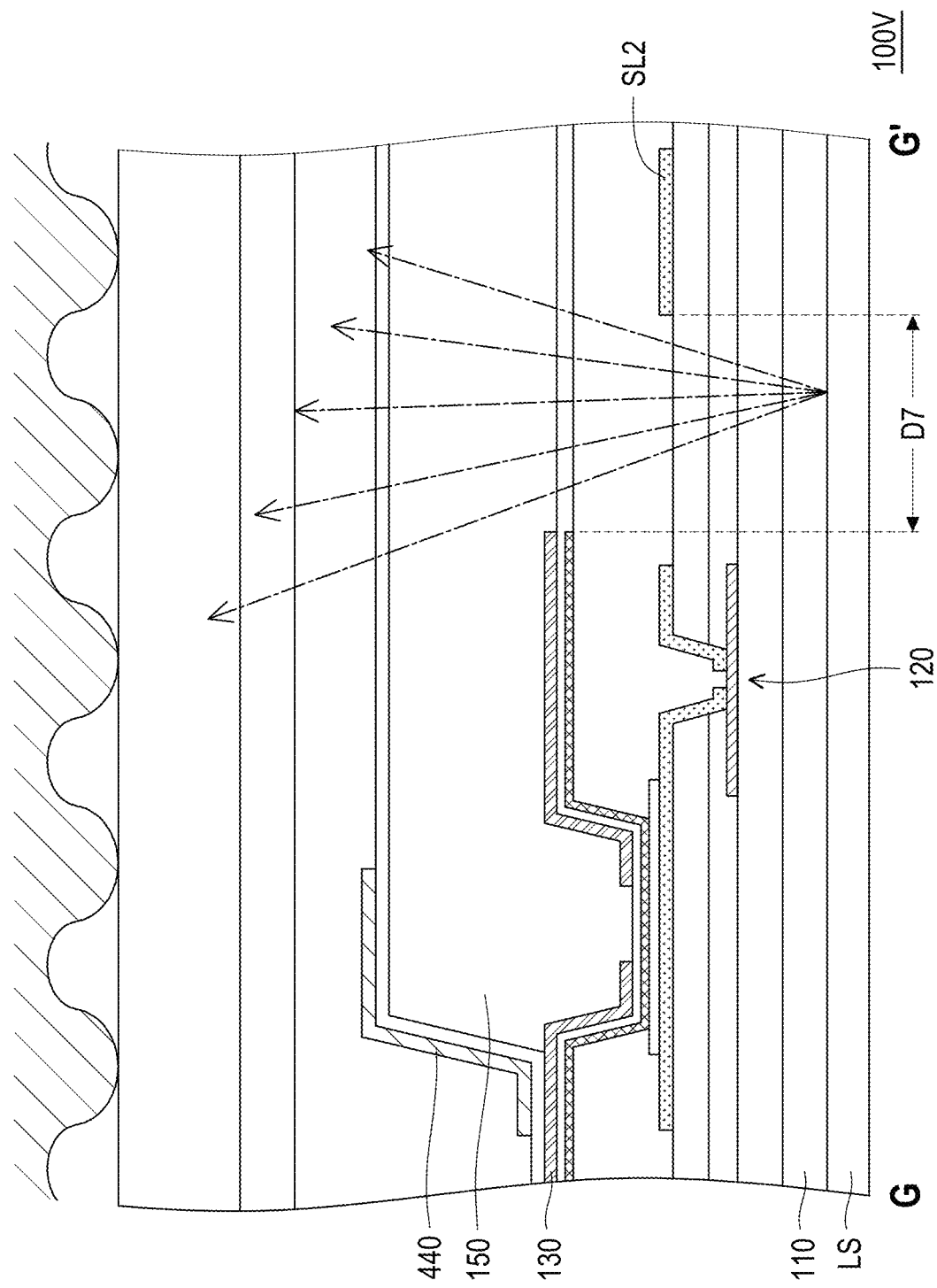
FIG. 11B is a schematic cross-sectional view taken along the section line G-G' of FIG. 11A.
Figure 11C:
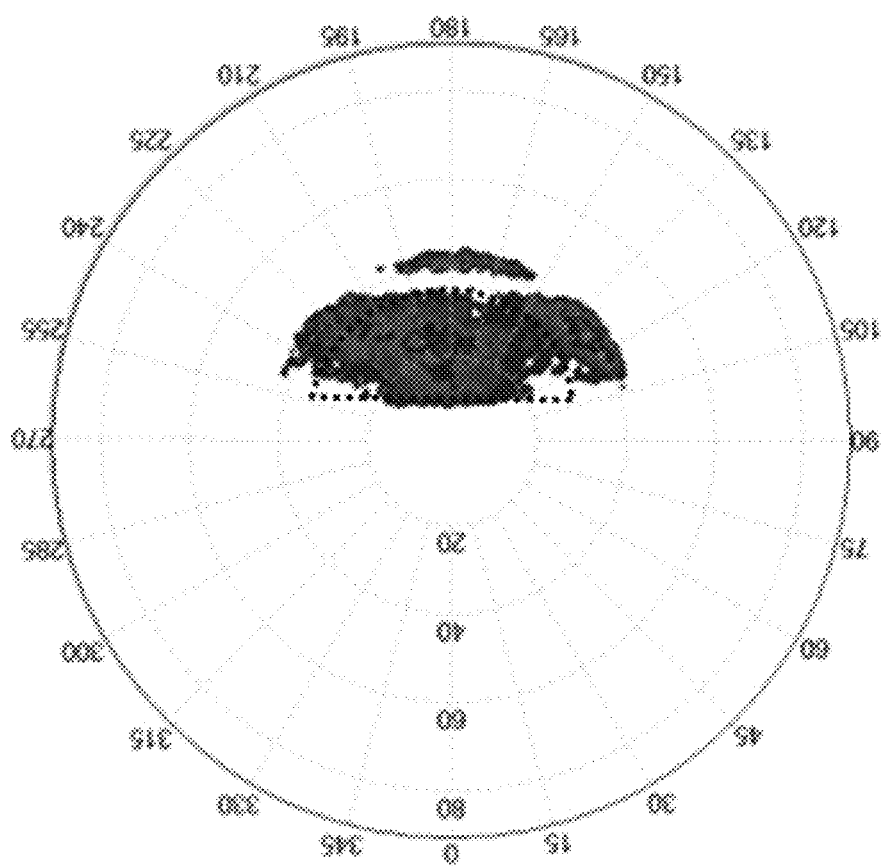
FIG. 11C is a simulation diagram of the distribution of light received by the sensing device 100V of FIG. 11A at positions with different light-receiving angles corresponding to different light incident angles.

FIG. 11A is a schematic partial top view of a sensing device 100V according to an embodiment of the disclosure. FIG. 11B is a schematic cross-sectional view taken along the section line G-G' of FIG. 11A. FIG. 11C is a simulation diagram of the distribution of light received by the sensing device 100V of FIG. 11A at positions with different light-receiving angles corresponding to different light incident angles.

With reference to both FIG. 11A and FIG. 11B, the sensing device 100V may include a first substrate 110, a first sensing element 120, a first light-shielding layer 130, a second light-shielding layer 440, an insulating layer 150, a light source LS and signal lines SL1 and SL2.

Compared with the sensing device 100 as shown in FIG. 10A to FIG. 10B, the sensing device 100V shown in FIG. 11A to FIG. 11B is mainly different in that the spacing D7 of the sensing device 100V is greater than the spacing D7 of the sensing device 100. For example, the spacing D7 of the sensing device 100V is about 1/4L or about 10 μm. It can be seen from the simulation diagram of the received light intensity distribution in FIG. 11C that the amount of stray light at small angles of the sensing device 100V is significantly more than that of the sensing device 100 shown in FIG. 10C. As such, it can be confirmed that shortening the spacing D7 can effectively avoid stray light at small angles.

In summary, the sensing device of the disclosure can flexibly adjust the light-receiving angle and light-receiving amount of the sensing element through the optical-mechanical structure composed of the first light-shielding layer and the second light-shielding layer, thereby effectively improving the signal-to-noise ratio of the sensing element. In addition, the sensing device of the disclosure can use the first light-shielding layer and the second light-shielding layer as the signal lines of the light emitting element, so as to simplify the integration structure of the sensing element and the light emitting element. In addition, the sensing device of the disclosure can also flexibly determine the configuration position of the light emitting element, making the sensing device more widely used.

Although the disclosure has been described in detail with reference to the above embodiments, the embodiments are not intended to limit the disclosure. Those skilled in the art should understand that it is possible to make changes and modifications without departing from the spirit and scope of the disclosure. Therefore, the protection scope of the disclosure shall be defined by the appended claims.

What is claimed is:

1. A sensing device, comprising:
   a first substrate;
   a first sensing element disposed over the first substrate;
   a first light-shielding layer disposed on the first sensing element and having a first opening, wherein the first opening completely overlaps the first sensing element;
   a second light-shielding layer disposed on the first light-shielding layer and including an upper light-shielding part and a lateral light-shielding part, wherein the upper light-shielding part overlaps the first light-shielding layer and has a second opening, and the lateral light-shielding part is separated from the upper light-shielding part; and
   an insulating layer disposed between the first light-shielding layer and the second light-shielding layer, wherein the lateral light-shielding part covers a sidewall of the insulating layer.

2. The sensing device according to claim 1, wherein the lateral light-shielding part is electrically connected to the first light-shielding layer.

3. The sensing device according to claim 1, wherein an angle between the lateral light-shielding part and the first light-shielding layer ranges from 30 degrees to 85 degrees.

4. The sensing device according to claim 1, wherein the second opening overlaps the first opening.

5. The sensing device according to claim 1, wherein the second opening does not overlap the first opening.

6. The sensing device according to claim 1, wherein the lateral light-shielding part surrounds the upper light-shielding part.

7. The sensing device according to claim 1, further comprising a light emitting element disposed on the second light-shielding layer, wherein a first electrode of the light emitting element is electrically connected to the upper light-shielding part, and a second electrode of the light emitting element is electrically connected to the lateral light-shielding part.

8. The sensing device according to claim 7, wherein the light emitting element partially overlaps the first sensing element.

9. The sensing device according to claim 7, wherein the light emitting element includes a first light emitting element and a second light emitting element, and a wavelength range of light emitted by the first light emitting element is different from a wavelength range of light emitted by the second light emitting element.

10. The sensing device according to claim 1, further comprising a second sensing element disposed between the first sensing element and the second light-shielding layer, wherein the first light-shielding layer serves as a first electrode of the second sensing element.

11. The sensing device according to claim 10, wherein the upper light-shielding part is electrically connected to a second electrode of the second sensing element.

12. The sensing device according to claim 10, wherein a gap between the upper light-shielding part and the lateral light-shielding part overlaps the second sensing element.

13. The sensing device according to claim 1, further comprising a second substrate and a third sensing element, wherein the second substrate is disposed over the second light-shielding layer, and the third sensing element is disposed between the second substrate and the second light-shielding layer.

14. A sensing device, comprising:
a first substrate;
a first sensing element disposed over the first substrate and includes:
a first electrode;
a second electrode disposed over the first electrode; and
a sensing layer disposed between the first electrode and the second electrode;
a first light-shielding layer disposed on the first sensing element and having a first opening, wherein the first opening overlaps the first electrode, the sensing layer and the second electrode;
a second light-shielding layer disposed on the first light-shielding layer and having a light-receiving region and a light-receiving edge adjacent to the light-receiving region; and
an insulating layer disposed between the first light-shielding layer and the second light-shielding layer,
wherein a ratio of a spacing between a side of an orthographic projection of the first opening on the second light-shielding layer farthest from the light-receiving edge and the light-receiving edge to a maximum spacing between the second light-shielding layer and the sensing layer is 0.3 to 1.8.

15. The sensing device according to claim 14, wherein a ratio of a light-receiving distance of the light-receiving region to the maximum spacing between the second light-shielding layer and the sensing layer is greater than or equal to a ratio of a distance between the second light-shielding layer and an upper surface of the sensing device to a distance between the sensing layer and the upper surface of the sensing device.

16. The sensing device according to claim 14, wherein a ratio of a light-receiving distance of the light-receiving region to a height difference between an upper surface of the first light-shielding layer and the first opening is greater than or equal to a ratio of a distance between the second light-shielding layer and an upper surface of the sensing device to a distance between the sensing layer and the upper surface of the sensing device.

17. The sensing device according to claim 14, further comprising a signal line, and a spacing between an orthographic projection of the first opening on the upper surface of the first light-shielding layer and an end of the first light-shielding layer close to the signal line is greater than or equal to a spacing between an orthographic projection of the signal line on the first light-shielding layer and the first light-shielding layer.

18. The sensing device according to claim 17, wherein the orthographic projection of the signal line on the first light-shielding layer is adjacent to the first light-shielding layer.

19. The sensing device according to claim 17, wherein a smaller one of a spacing between the orthographic projection of the signal line on the first light-shielding layer and the first light-shielding layer and a spacing between an orthographic projection of the signal line on the second light-shielding layer and the second light-shielding layer is less than or equal to half of a spacing between centers of two adjacent first opening.

20. The sensing device according to claim 17, further comprising a first sensing unit and a second sensing unit, wherein the first sensing unit includes the first sensing element, the first light-shielding layer and the second light-shielding layer, the second sensing unit includes the first sensing element, the second light-shielding layer and a third light-shielding layer, a position of the third light-shielding layer relative to the first sensing element and the second light-shielding layer in the second sensing unit is the same as a position of the first light-shielding layer relative to the first sensing element and the second light-shielding layer in the first sensing unit, and the third light-shielding layer has no opening.

* * * * *